United States Patent
Mihota

(10) Patent No.: US 10,205,620 B2
(45) Date of Patent: *Feb. 12, 2019

(54) TRANSMISSION CIRCUIT, TRANSMISSION METHOD, AND TRANSMISSION SYSTEM

(71) Applicant: SONY CORPORATION, Tokyo (JP)

(72) Inventor: Norihito Mihota, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,072

(22) Filed: Dec. 27, 2016

(65) Prior Publication Data

US 2017/0111203 A1 Apr. 20, 2017

Related U.S. Application Data

(63) Continuation of application No. 14/888,664, filed as application No. PCT/JP2014/060529 on Apr. 11, 2014, now Pat. No. 9,571,325.

(30) Foreign Application Priority Data

May 7, 2013 (JP) .................. 2013-097528

(51) Int. Cl.
  *H04L 27/36* (2006.01)
  *H04L 27/34* (2006.01)
  *H04L 27/04* (2006.01)
  *H04L 25/03* (2006.01)

(52) U.S. Cl.
  CPC .......... *H04L 27/3405* (2013.01); *H04L 27/04* (2013.01); *H04L 2025/03388* (2013.01)

(58) Field of Classification Search
  CPC ..... H04L 27/34; H04L 27/362; H04L 1/0071; H04L 25/03834; H04L 1/0041; H04L 1/0003; H04L 5/0007; H04L 1/0009; H04L 27/0008
  USPC ........................... 375/298, 295, 219
  See application file for complete search history.

(56) References Cited

U.S. PATENT DOCUMENTS

| | | | |
|---|---|---|---|
| 2003/0198478 A1 | 10/2003 | Vrazel et al. | |
| 2003/0235246 A1* | 12/2003 | Dress ...................... | H04B 14/04 375/238 |
| 2008/0224784 A1* | 9/2008 | Whittet .................. | H03B 21/00 331/48 |

(Continued)

FOREIGN PATENT DOCUMENTS

| | | |
|---|---|---|
| JP | 10-51361 A | 2/1998 |
| JP | 2000-286903 A | 10/2000 |

(Continued)

OTHER PUBLICATIONS

Extended European Search Report of EP Patent Application No. 14794451.6, dated Nov. 16, 2016, 8 pages.

(Continued)

*Primary Examiner* — Zewdu Kassa
(74) *Attorney, Agent, or Firm* — Chip Law Group

(57) ABSTRACT

In a transmission circuit that transmits transmission data using an amplitude shift modulation method (ASK modulation method) for changing an amplitude of carrier waves based on the transmission data or a transmission system that uses the transmission circuit, a phase of the carrier waves is changed based on the transmission data to suppress an irradiation of carrier wave components.

11 Claims, 18 Drawing Sheets

(56) References Cited

U.S. PATENT DOCUMENTS

| | | |
|---|---|---|
| 2010/0034316 A1 | 2/2010 | Korevaar |
| 2013/0010848 A1 | 1/2013 | Shimizu et al. |
| 2014/0334531 A1* | 11/2014 | Jeckeln .................. H04L 25/06 375/240 |
| 2015/0003499 A1* | 1/2015 | Boutillon ............ H04L 27/2003 375/146 |

FOREIGN PATENT DOCUMENTS

| | | |
|---|---|---|
| JP | 2001-024718 A | 1/2001 |
| JP | 2008-172787 A | 7/2008 |
| JP | 2010-114662 A | 5/2010 |
| JP | 2010-224654 A | 10/2010 |
| JP | 2011-077567 A | 4/2011 |
| JP | 2012-080150 A | 4/2012 |

OTHER PUBLICATIONS

Zhang, et al., "Photonic DPASK/QAM Signal Generation at Microwave/Millimeter-Wave Band Based on an Electro-Optic Phase Modulator", Optics Letters, vol. 33, No. 20, Oct. 15, 2008, pp. 2332-2334.
Ohm, et al., "Quaternary Optical ASK-DPSK and Receivers With Direct Detection", IEEE Photonics Technology Letters, vol. 15, No. 1, Jan. 2013, pp. 159-161.

\* cited by examiner

Modulation signal

Modulation signal

Modulation signal

Modulation signal

Modulation signal

Modulation signal (Integral value:  +1   　0  −1   　0  +1  +2  　　+1   　0  −1 )

Transmission data
0  1  0  1  1  0  1  1  1  0  0  1  0  0  1  1

Transmission data
0 1 0 1 1 0 1 1 1 0 0 1 0 0 1 1

Transmission data
0 1 0 1 1 0 1 1 1 0 0 1 0 0 1 1

| | | | | | | | | | | | | | | | |
|---|---|---|---|---|---|---|---|---|---|---|---|---|---|---|---|
| input | $a_1$: | 0 | 1 | 0 | 1 | 1 | 0 | 1 | 1 | 1 | 0 | 0 | 1 | 0 | 0 | 1 | 1 | 1 | |
| | $a_2$: | 0 | 0 | 1 | 0 | 1 | 1 | 1 | 0 | 1 | 1 | 0 | 0 | 1 | 0 | 0 | 1 | 1 | | |
| | $b_1$: | 0 | 1 | 0 | 1 | 0 | 0 | 1 | 0 | 0 | 0 | 1 | 0 | 0 | 1 | 0 | 0 | | $= D(a_1)$ |
| | | | | | | | | | | | | | | | | | | | $= a_1 \,\&\, !a_2$ |
| output(p) | $c_1$: | 0 | 0 | 1 | 0 | 0 | 0 | 1 | 1 | 0 | 0 | 0 | 0 | 0 | 0 | 0 | 0 | | $= a_2 \,\&\, !D(f_2)$ |
| output(n) | $c_2$: | 0 | 0 | 0 | 0 | 1 | 1 | 0 | 0 | 0 | 0 | 0 | 1 | 0 | 0 | 1 | 1 | | $= a_2 \,\&\, D(f_2)$ |
| | | | | | | | | | | | | | | | | | | | |
| | $s_1$: | 0 | 0 | 1 | 1 | 0 | -1 | -1 | 0 | 1 | 2 | 2 | 2 | 1 | 1 | 1 | 0 | -1 | $= s_2 + c_1 - c_2$ |
| | $s_2$: | 0 | 0 | 0 | 1 | 1 | 0 | -1 | -1 | 0 | 1 | 2 | 2 | 2 | 1 | 1 | 1 | 0 | $= D(s_1)$ |
| | $f_1$: | 0 | 0 | 1 | 1 | 0 | 0 | 0 | 0 | 1 | 1 | 1 | 1 | 1 | 1 | 1 | 0 | 0 | $= s_1 > 0$ |
| | $f_2$: | 0 | 0 | 0 | 1 | 1 | 0 | 0 | 0 | 0 | 1 | 1 | 1 | 1 | 1 | 1 | 1 | 1 | $= b_1 \,?\, f_1 : D(f_2)$ |
| $D(f_2)$: | | 0 | 0 | 0 | 0 | 1 | 1 | 0 | 0 | 0 | 0 | 0 | 1 | 1 | 1 | 1 | 1 | 1 | $= D(f_2)$ |

FIG.18

TRANSMISSION CIRCUIT, TRANSMISSION METHOD, AND TRANSMISSION SYSTEM

CROSS-REFERENCE PARAGRAPH

The present application is a continuation application of U.S. patent application Ser. No. 14/888,664, filed Nov. 2, 2015, which is a National Stage of PCT/JP2014/060529, filed Apr. 11, 2014, and claims the benefit of priority from prior Japanese Patent Application JP2013-097528, filed May 7, 2013, the entire content of which is hereby incorporated by reference. Each of the above-referenced applications is hereby incorporated herein by reference in its entirety.

TECHNICAL FIELD

The present disclosure relates to a transmission circuit, a transmission method, and a transmission system.

BACKGROUND ART

In a transmission system, that is, a transmission system that transmits signals in a single apparatus, for example, a miniaturization and low power consumption of a transmission circuit and a reception circuit are required. To satisfy such a requirement, a compact ASK (Amplitude Shift Keying) modulation method of a low power consumption is used as a modulation method for modulating signals in a transmission circuit (see, for example, Patent Document 1).

Patent Document 1: Japanese Patent Application Laid-open No. 2011-77567

SUMMARY OF INVENTION

Problem to be Solved by the Invention

On the other hand, in the ASK modulation, it is difficult to satisfy the regulations of EMI (Electro Magnetic Interference) since an irradiation of carrier components is large. The satisfaction of the EMI regulations leads to lowering of transmission power. Furthermore, the lowering of the transmission power leads to lowering of a reception sensitivity on a reception circuit side and also to weakening against interfering waves.

In this regard, the present disclosure aims at providing a transmission circuit, a transmission method, and a transmission system that uses the transmission circuit (transmission method), that are capable of suppressing an irradiation of carrier waves without lowering transmission power so as to satisfy the EMI regulations.

Means for Solving the Problem

To attain the object described above, according to the present disclosure, there is provided a transmission circuit including:
an amplitude shift modulation circuit that changes an amplitude of carrier waves based on transmission data; and
a phase control circuit that changes a phase of the carrier waves based on the transmission data.

Further, to attain the object described above, according to the present disclosure, there is provided a transmission method including:
changing, in transmitting transmission data using an amplitude shift modulation method for changing an amplitude of carrier waves based on the transmission data, a phase of the carrier waves based on the transmission data.

Furthermore, to attain the object described above, according to the present disclosure, there is provided a transmission system including:
a transmission circuit; and
a reception circuit that receives a signal transmitted from the transmission circuit,
the transmission circuit including
an amplitude shift modulation circuit that changes an amplitude of carrier waves based on transmission data, and
a phase control circuit that changes a phase of the carrier waves based on the transmission data.

In the transmission circuit, the transmission method, or the transmission system having the structure described above, the amplitude shift modulation (ASK modulation) is a modulation method involving superimposing information on the transmission data on an amplitude of the carrier waves, and the phase of the carrier waves is uninvolved with the information on the transmission data. By changing the phase of the carrier waves uninvolved with the information (information is not superimposed) based on the transmission data, a peak level of a carrier wave component on a frequency axis can be lowered based on a phase modulation principle without influencing the amplitude of the carrier waves onto which the information on the transmission data is superimposed.

Effect of the Invention

According to the present disclosure, the peak level of a carrier wave component on a frequency axis can be lowered. Therefore, an irradiation of carrier wave components can be suppressed without lowering the transmission power so as to satisfy the EMI regulations.

It should be noted that the effects described in the specification are mere examples and are not limited thereto, and there may be additional effects.

BRIEF DESCRIPTION OF DRAWINGS

FIG. 18 is a diagram showing input/output logical values of circuit sections accompanying operational descriptions of the encoding circuit shown in FIG. 17.

MODES FOR CARRYING OUT THE INVENTION

Figure 1A:
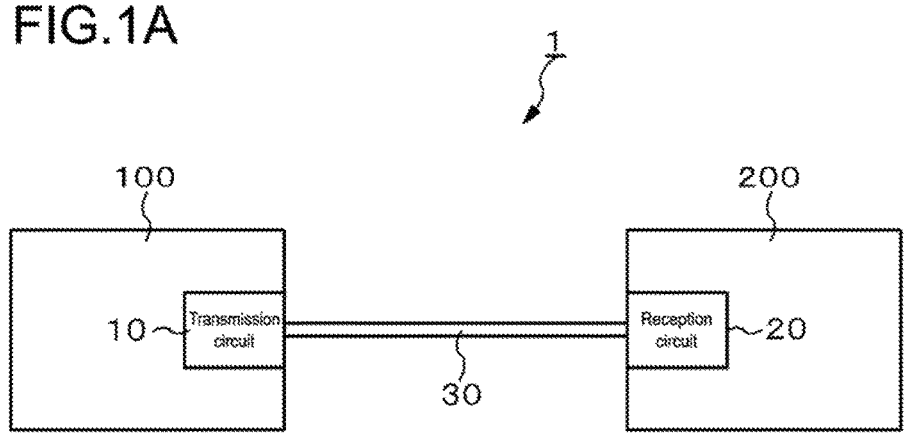
FIG. 1A is a block diagram showing a structural example of a transmission system to which the technique of the present disclosure is applied.

Hereinafter, a form for embodying the technique of the present disclosure (hereinafter, referred to as "embodiment") will be specifically described with reference to the drawings. The present disclosure is not limited to the embodiment, and various numerical values and the like in the embodiment are examples. In the descriptions below, the same elements or elements having the same function are denoted by the same reference numerals, and overlapping descriptions will be omitted. It should be noted that the descriptions will be given in the following order.
1. General description on transmission circuit, transmission method, and transmission system of present disclosure
2. Transmission system to which technique of present disclosure is applied
3. Transmission system according to embodiment
<General Description on Transmission Circuit, Transmission Method, and Transmission System of Present Disclosure>

A transmission system that transmits high-frequency signals of electromagnetic waves, particularly microwaves, millimeter waves, terahertz waves, and the like while using a waveguide as a medium is favorably used in a mutual signal transmission among various apparatuses such as an electronic apparatus, an information processing apparatus, and a semiconductor apparatus, a mutual signal transmission among circuit boards in a single apparatus, and the like. In the transmission system, a waveguide that transmits a high-frequency signal has a function as a cable that mutually connects the apparatuses or circuit boards and is thus called waveguide cable.

Of the high frequency waves, millimeter waves are radio waves that have a frequency of 30 [GHz] to 300 [GHz] (wavelength of 1 [mm] to 10 [mm]), for example. By performing a signal transmission in a millimeter waveband, a high-speed signal transmission of a Gbps order (e.g., 5 or more) can be realized. Examples of a signal that requires a high-speed signal transmission of a Gbps order are data signals of a movie video, a computer image, and the like. Moreover, the signal transmission in a millimeter waveband is excellent in interference resistance and has an advantage that other electrical wirings in a cable connection among the apparatuses are not interfered.

In the transmission system that transmits high-frequency signals such as millimeter waveband signals, a waveguide cable may be constituted of a hollow waveguide, a dielectric waveguide, or a waveguide in which a dielectric body is filled in a tube (hereinafter, referred to as "dielectric waveguide"). It should be noted that it is favorable to use the dielectric waveguide having an excellent flexibility as compared to the hollow waveguide. In the dielectric waveguide, electromagnetic waves propagate in the dielectric body while forming an electromagnetic field corresponding to the wavelength (frequency) and the like.

In a transmission circuit according to the present disclosure, a phase control circuit is structured to change a phase of carrier waves so as to lower a peak level of a carrier wave component on a frequency axis.

In the transmission circuit according to the present disclosure including the favorable structure and form described above, the phase control circuit may be structured to change the phase of carrier waves for each bit of transmission data. At this time, the phase may be randomly switched with respect to the bit of the transmission data. Further, the phase may be alternately switched with respect to Logic 1 or Logic 0 of the transmission data.

Alternatively, in the transmission circuit according to the present disclosure including the favorable structure and form described above, the phase control circuit may change the phase of the carrier waves for each gathering of Logics 1 or Logics 0 of the transmission data. At this time, the phase may be randomly switched with respect to the gathering of Logics 1 or Logics 0 of the transmission data. Furthermore, the phase may be alternately switched with respect to the gathering of Logics 1 or Logics 0 of the transmission data. Alternatively, the phase may be switched such that an emergence count of +(0 degree) becomes equal to that of −(180 degrees) with respect to the gathering of Logics 1 or Logics 0 of the transmission data. Here, although + and − express phases of 0 degree and 180 degrees, the values may be set freely as long as a phase relation with a difference of 180 degrees is obtained.

<Transmission System to which Technique of Present Disclosure is Applied>

Figure 1B:
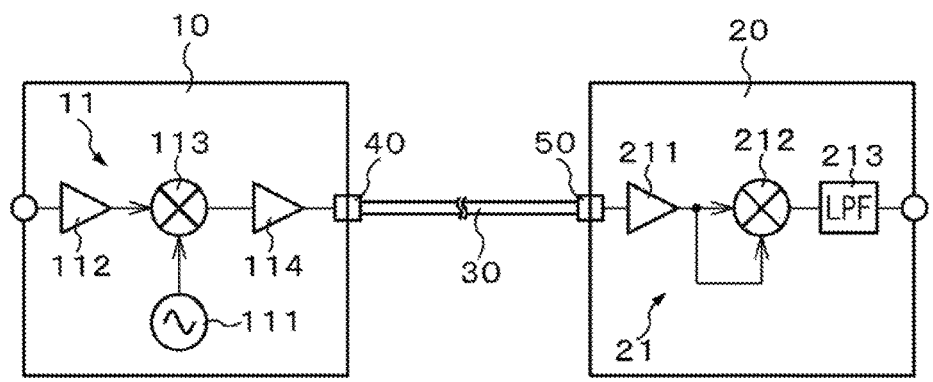
FIG. 1B is a block diagram showing an example of specific structures of a transmission circuit and a reception circuit in the transmission system.

An example of a structure of the transmission system to which the technique of the present disclosure is applied will be described with reference to FIGS. 1A and 1B. FIG. 1A is a block diagram showing a structural example of the transmission system to which the technique of the present disclosure is applied, and FIG. 1B is a block diagram showing an example of specific structures of a transmission circuit and a reception circuit in the transmission system.

As shown in FIG. 1, the transmission system 1 of the present application example includes a transmission circuit (transmission section) 10 that transmits high-frequency signals, a reception circuit (reception section) 20 that receives high-frequency signals, and a waveguide cable (waveguide) 30 that transmits high-frequency signals between the transmission circuit 10 and the reception circuit 20.

Here, an example of the transmission system that transmits high-frequency signals such as millimeter waveband signals using the waveguide cable will be described. The waveguide cable may be constituted of a hollow waveguide or a dielectric waveguide. Since the high-frequency signals are millimeter waveband signals (millimeter wave communication), there are the following advantages.
a) Since the millimeter wave communication can use a wide communication band, a high data rate can be easily used.
b) Since the frequency used for the transmission can be separated from frequencies of other baseband signal processing, an interference of frequencies of the millimeter waves and baseband signals hardly occurs.
c) Since the millimeter waveband has a short wavelength, the waveguide structure that is determined based on the wavelength can be made small. In addition, since a distance attenuation is large and there is less diffractions, it is easy to perform an electromagnetic shield.
d) In a normal wireless communication, there is a strict regulation on a stability degree of carrier waves for preventing an interference and the like. For realizing such carrier waves having a high stability degree, an external frequency reference component, a multiplier circuit, a PLL (Phase-Locked Loop circuit), and the like having a high stability degree are used, with the result that the circuit scale becomes large. In contrast, in the millimeter wave communication, it is possible to use carrier waves having a low stability degree for the transmission as well as prevent the carrier waves from leaking outside with ease, and thus an increase of the circuit scale can be suppressed.

In the transmission system 1 according to the present application example that transmits millimeter waveband signals, the transmission circuit 10 carries out processing of converting transmission target signals into millimeter waveband signals and outputting them to the waveguide cable 30. The reception circuit 20 carries out processing of receiving the millimeter waveband signals transmitted via the waveguide cable 30 and restoring the signals to the original transmission target signals.

In the present application example, the transmission circuit 10 is provided in a first communication apparatus 100, and the reception circuit 20 is provided in a second communication apparatus 200. In this case, the waveguide cable 30 transmits high-frequency signals between the first communication apparatus 100 and the second communication apparatus 200. In the communication apparatuses 100 and 200 that exchange signals via the waveguide cable 30, the transmission circuit 10 and the reception circuit 20 are arranged as a pair. A signal transmission method between the first communication apparatus 100 and the second communication apparatus 200 may be a unidirectional (one direction) transmission method or may be a bidirectional transmission method.

The transmission circuit 10 (first communication apparatus 100) and the reception circuit 20 (second communication apparatus 200) are arranged within a predetermined range. Here, since the high-frequency signals are millimeter wave signals, the "predetermined range" refers to a range within which a transmission range of millimeter waves can be restricted. Typically, a range with a shorter distance than a distance between communication apparatuses used in broadcast or a general wireless communication corresponds to the "predetermined range".

As a structure in which the transmission circuit 10 and the reception circuit 20 are arranged within the predetermined range, the following structure can be exemplified in addition to the structure in which separate communication apparatuses (electronic apparatuses), that is, the first communication apparatus 100 and the second communication apparatus 200, are arranged as shown in FIG. 1A. For example, a structure in which the transmission circuit 10 and the reception circuit 20 are arranged on different circuit boards in a single electronic apparatus will be discussed. In the case of such a structure, one of the circuit boards corresponds to the first communication apparatus 100, and the other one of the circuit boards corresponds to the second communication apparatus 200.

In addition, a structure in which the transmission circuit 10 and the reception circuit 20 are arranged on different semiconductor chips in a single electronic apparatus will be discussed. In the case of such a structure, one of the semiconductor chips corresponds to the first communication apparatus 100, and the other one of the semiconductor chips corresponds to the second communication apparatus 200. Further, a structure in which the transmission circuit 10 and the reception circuit 20 are arranged in different circuit sections on the same circuit board will be discussed. In the case of such a structure, one of the circuit sections corresponds to the first communication apparatus 100, and the other one of the circuit sections corresponds to the second communication apparatus 200, though not limited to those structures.

On the other hand, as examples of the combination of the first communication apparatus 100 and the second communication apparatus 200, there are the following combinations, though the exemplified combinations are mere examples and should not be limited thereto.

When the second communication apparatus 200 is a battery-drive apparatus such as a cellular phone, a digital camera, a video camera, a game device, and a remote controller, the first communication apparatus 100 may be a battery charger therefor or an apparatus called base station that carries out image processing and the like. Alternatively, when the second communication apparatus 200 is a relatively thin IC-card type apparatus, the first communication apparatus 100 may be a card reader/writer apparatus. The card reader/writer apparatus is additionally used in combination with an electronic apparatus body of, for example, a digital recording/reproducing apparatus, a terrestrial television receiver, a cellular phone, a game device, and a computer. Moreover, in the case of an application to an image pickup apparatus, the first communication apparatus 100 is arranged on a main substrate side and the second communication apparatus 200 is arranged on an image pickup substrate side, and a signal transmission is performed within a single apparatus, for example.

Next, with reference to FIG. 1B, an example of a specific structure of the transmission circuit 10 and the reception circuit 20 will be described.

The transmission circuit 10 includes a signal generation section 11 that processes a transmission target signal and generates a millimeter wave signal. The signal generation section 11 is a signal conversion section that converts the transmission target signal into a millimeter wave signal and is constituted of, for example, an ASK (Amplitude Shift Keying) modulation circuit.

Specifically, the signal generation section 11 multiplies the millimeter wave signal supplied from an oscillator 111 by the transmission target signal supplied via a buffer 112 by a multiplier 113 to generate a millimeter wave ASK modulation wave, and outputs it via a buffer 114. It should be noted that although a single input is used in this example, a differential input may be used by providing a differential amplifier in place of the buffer 112. A connector apparatus 40 is interposed between the transmission circuit 10 and the waveguide cable 30.

On the other hand, the reception circuit 20 includes a signal restoring section 21 that processes the millimeter wave signal supplied via the waveguide cable 30 and restores it to the original transmission target signal, for example. The signal restoring section 21 is a signal conversion section that converts the received millimeter wave signal into the original transmission target signal and is constituted of, for example, a square detection circuit. Specifically, the signal restoring section 21 squares the millimeter wave signal (ASK modulation wave) supplied via a buffer 211 by a multiplier 212 to convert it into a transmission target signal, and outputs it via an LPF (Low-Pass Filter) 213.

Here, although the square detection circuit is exemplified as the signal restoring section 21, it is not limited to the square detection circuit and an envelope curve detection circuit may be used instead. A modulation that supports the square detection or envelope curve detection is only the ASK modulation including an OOK (On Off Keying) modulation. Incidentally, a case of a modulation degree=1 in the ASK modulation is the OOK modulation.

A connector apparatus 50 is interposed between the waveguide cable 30 and the reception circuit 20. The waveguide cable 30 has a waveguide structure that transmits millimeter waves while keeping them inside a waveguide and has a characteristic of efficiently transmitting millimeter waveband electromagnetic waves. When the waveguide cable 30 is constituted of a dielectric waveguide, for example, it is favorable to use a dielectric waveguide structured by including a dielectric material having a relative permittivity within a certain range and a dielectric tangent within a certain range.

Here, the "certain range" only needs to be a range within which a desired effect can be obtained regarding the relative permittivity or dielectric tangent of the dielectric material, and a predetermined value within that range only needs to be used. It should be noted that the characteristics of the dielectric waveguide cannot be determined by the dielectric material alone, and a transmission path length or a millimeter wave frequency (wavelength) are also related to the determination on the characteristics. Therefore, although the relative permittivity and dielectric tangent of the dielectric material are not clearly defined, they can be set as follows, for example.

For transmitting millimeter wave signals at a high speed in the dielectric waveguide, it is desirable to set the relative permittivity of the dielectric material to be about 2 to 10 (favorably 3 to 6) and the dielectric tangent to be about 0.00001 to 0.01 (favorably 0.00001 to 0.001). Examples of the dielectric material that satisfies such a condition are an acrylic resin-based material, a urethane resin-based material, an epoxy resin-based material, a silicon-based material, a polyimide-based material, and a cyanoacrylate resin-based material.

<Transmission System According to Embodiment of Present Disclosure>

The transmission system according to this embodiment is desirably applied to a serial transmission that uses an encoding method for suppressing a DC component and a low frequency component, such as 8b10b, that is used in a high-speed serial interface, though not limited to the application to the serial transmission. Here, 8b10b is an encoding method for a transmission that converts 8-bit data into a 10-bit symbol. In the transmission system of this embodiment, high-frequency signals such as millimeter waveband signals are transmitted while being kept inside the waveguide using the waveguide cable. In the transmission system of this embodiment, the transmission circuit that uses the ASK modulation circuit has a characteristic of changing a phase of carrier waves based on transmission data.

Here, a modulation signal in a case where the phase of carrier waves is not changed and a case where it is changed will specifically be described.

Figure 2A:
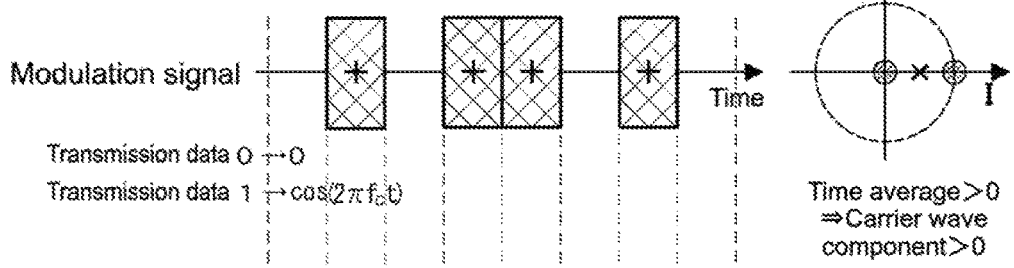
FIG. 2A is a diagram showing a modulation signal and an I-Q plane vector in a case where a phase of carrier waves is not changed in an ASK modulation with a modulation degree=1.

First, the ASK modulation with the modulation degree=1 (i.e., OOK modulation) will be described with reference to FIGS. 2A and 2B. FIG. 2A is a diagram showing a modulation signal and an I-Q plane vector in a case where a phase of carrier waves is not changed in the ASK modulation with the modulation degree=1, and FIG. 2B is a diagram showing the modulation signal and the I-Q plane vector in a case where the phase of carrier waves is changed in the ASK modulation with the modulation degree=1.

In the case shown in FIG. 2A where the phase of carrier waves is not changed, the modulation signal becomes 0 when the transmission data is 0 and becomes $\cos(2\pi f_c t)$ when the transmission data is 1. At this time, as indicated by x in the I-Q plane vector diagram, a time average of the modulation signal is larger than 0, and an average carrier wave component is also larger than 0.

Figure 2B:
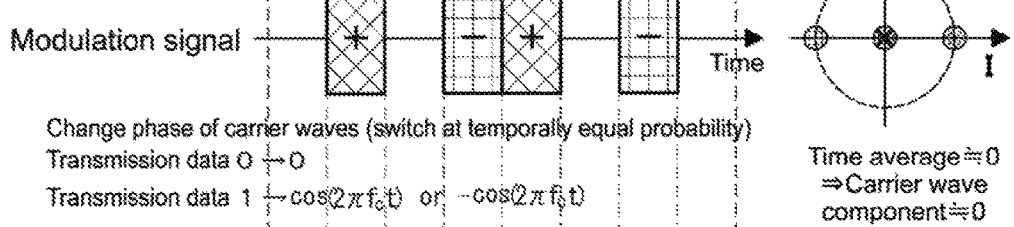
FIG. 2B is a diagram showing the modulation signal and the I-Q plane vector in a case where the phase of carrier waves is changed in the ASK modulation with the modulation degree=1.

In the case shown in FIG. 2B where the phase of carrier waves is changed (e.g., switches at temporally equal probability), the modulation signal becomes 0 when the transmission data is 0 and becomes $\cos(2\pi f_c t)$ or $-\cos(2\pi f_c t)$ when the transmission data is 1. At this time, as indicated by x in the I-Q plane vector diagram, the time average of the modulation signal becomes substantially 0, and the average carrier wave component also becomes substantially 0.

Figure 2C:
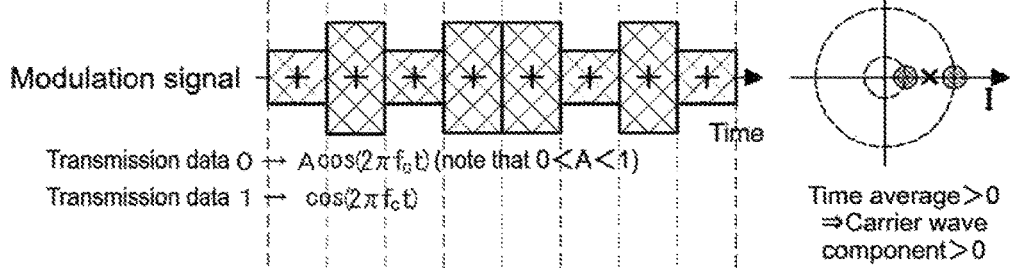
FIG. 2C is a diagram showing the modulation signal and the I-Q plane vector in a case where the phase of carrier waves is not changed in the ASK modulation with the modulation degree<1.

Next, the ASK modulation with the modulation degree<1 will be described with reference to FIGS. 2C and 2D. FIG. 2C is a diagram showing the modulation signal and the I-Q plane vector in a case where the phase of carrier waves is not changed in the ASK modulation with the modulation degree<1, and FIG. 2D is a diagram showing the modulation signal and the I-Q plane vector in a case where the phase of carrier waves is changed in the ASK modulation with the modulation degree<1.

In the case shown in FIG. 2C where the phase of carrier waves is not changed, the modulation signal becomes $A \cos(2\pi f_c t)$ when the transmission data is 0 (note that 0<A<1) and becomes $\cos(2\pi f_c t)$ when the transmission data is 1. At this time, as indicated by x in the I-Q plane vector diagram, the time average of the modulation signal is larger than 0, and the average carrier wave component is also larger than 0.

Figure 2D:
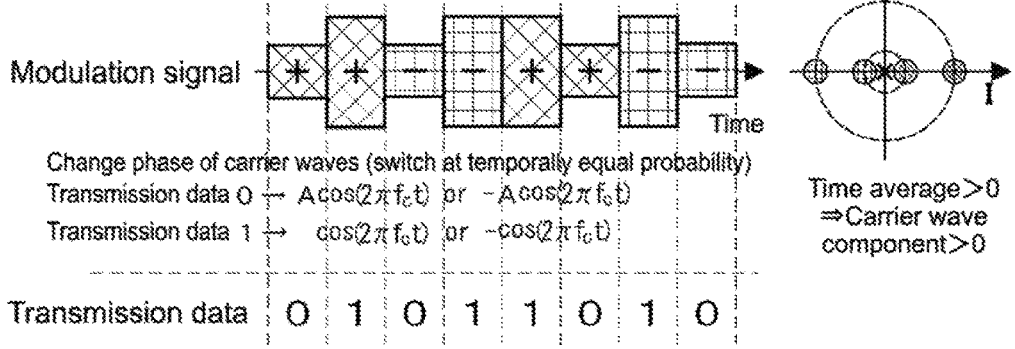
FIG. 2D is a diagram showing the modulation signal and the I-Q plane vector in a case where the phase of carrier waves is changed in the ASK modulation with the modulation degree<1.

In the case shown in FIG. 2D where the phase of carrier waves is changed (e.g., switches at temporally equal probability), the modulation signal becomes $A \cos(2\pi f_c t)$ or $-A \cos(2\pi f_c t)$ when the transmission data is 0 and becomes $\cos(2\pi f_c t)$ or $-\cos(2\pi f_c t)$ when the transmission data is 1. At this time, as indicated by x in the I-Q plane vector diagram, the time average of the modulation signal becomes substantially 0, and the average carrier wave component also becomes substantially 0.

Figure 3A:
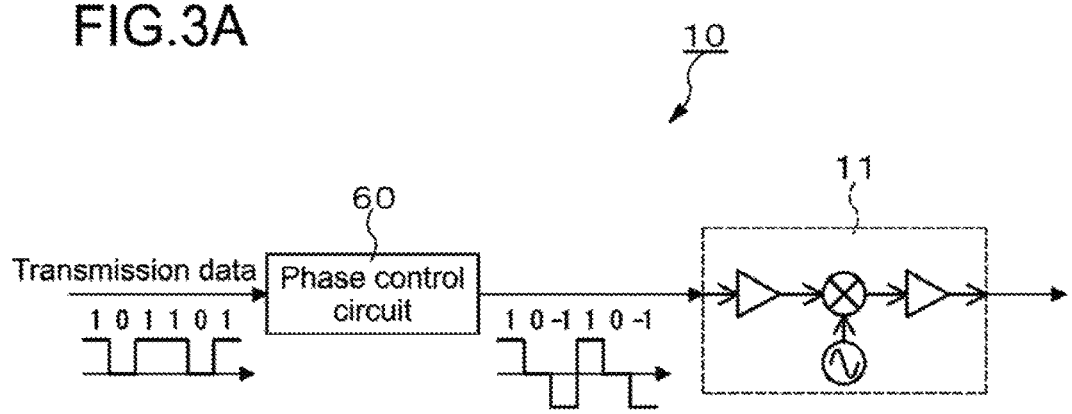
FIG. 3A is a block diagram showing a structural example of the transmission circuit according to an embodiment.

In this embodiment, as shown in FIG. 3A, a phase control circuit 60 is provided in the transmission circuit 10 including the signal generation section 11 constituted of the ASK modulation circuit. By an operation of the phase control circuit 60, the phase of carrier waves is changed such that a vector sum becomes substantially 0 by a time average, that is, such that a carrier peak level is canceled out. It should be noted that although the example above describes the case where the phase of carrier waves is changed between 0 degree (+) and 180 degrees (−), the present disclosure is not limited thereto and only needs to be in a positional relationship with which the vector sum approaches 0 by a time average.

Figure 3B:
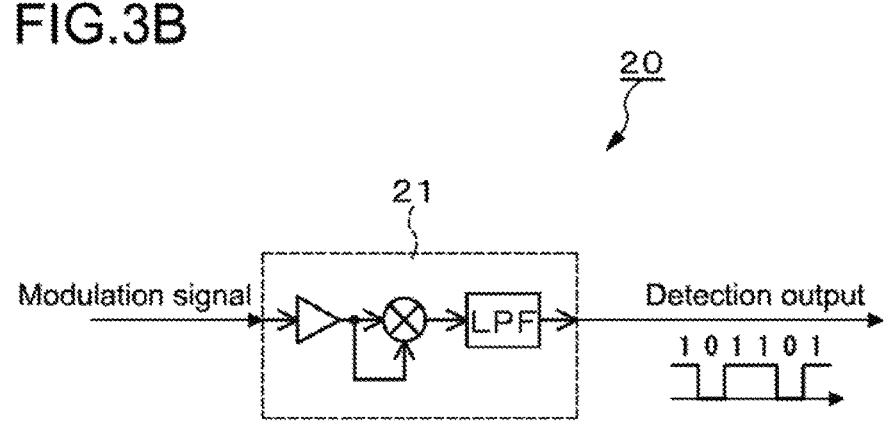
FIG. 3B is a block diagram showing a structural example of the reception circuit according to the embodiment.

In the transmission circuit 10 that uses the ASK modulation, by changing the phase of carrier waves onto which information is not superimposed based on the transmission data, a peak level of the carrier wave component on a frequency axis can be lowered based on a phase modulation principle without influencing an amplitude of carrier waves onto which information of the transmission data is superimposed. By lowering the peak level of the carrier wave component on the frequency axis, an irradiation of carrier wave components can be suppressed without lowering transmission power so as to satisfy the EMI regulations. Moreover, even when the phase of carrier waves is changed, since the modulation is basically the ASK modulation including the OOK modulation, the signal restoring section 21, that is, the square detection circuit (or envelope curve detection circuit) can be used as it is in the reception circuit 20 as shown in FIG. 3B.

Next, a specific structural example of the transmission system of this embodiment will be described with reference to FIGS. 4A and 4B.

[Structural Example 1]

Figure 4A:
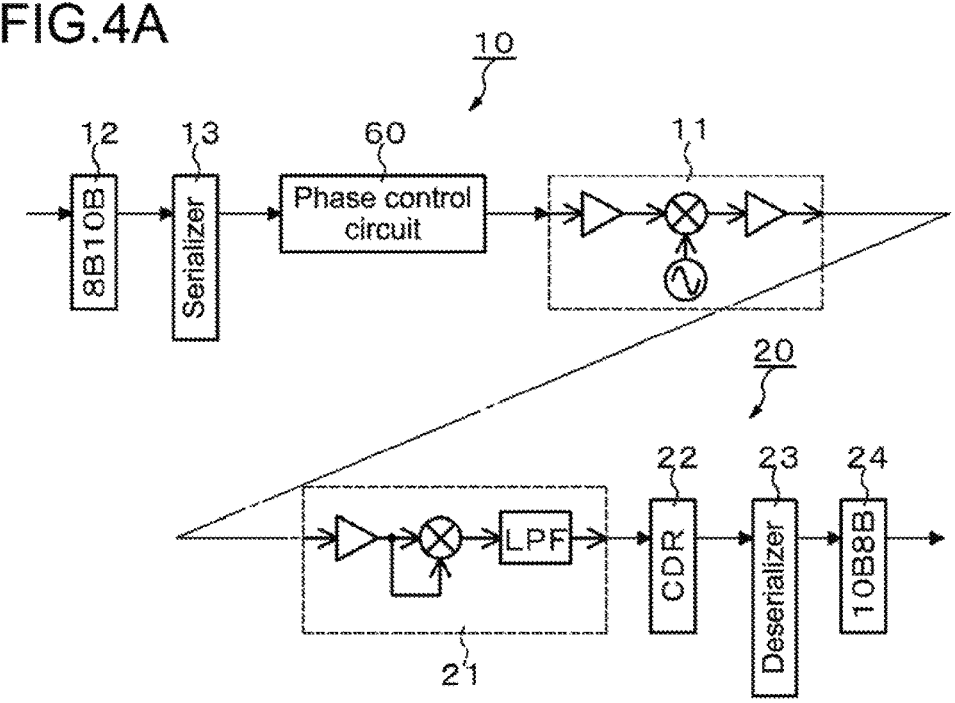
FIG. 4A is a block diagram showing a structural example 1 of the transmission system according to the embodiment.

FIG. 4A is a block diagram showing a structural example 1 of the transmission system according to this embodiment. In the transmission system according to the structural example 1, the transmission circuit 10 includes, in addition to the signal generation section 11 constituted of the ASK modulation circuit, an 8B10B circuit 12, a serializer circuit 13, and the phase control circuit 60. The 8B10B circuit 12 carries out processing of converting 8-bit data into 10-bit data. The serializer circuit 13 carries out processing of converting parallel data into serial data. The phase control circuit 60 is a circuit section that changes the phase of carrier waves based on transmission data, that is a feature of this embodiment, and is constituted of an encoding circuit that carries out encoding processing on the transmission data for suppressing carrier wave components. In the structural example 1, a structure in which the phase control circuit 60 is interposed between the serializer circuit 13 and the signal generation section 11 is adopted.

On the other hand, the reception circuit 20 includes, in addition to the signal restoring section 21 constituted of the square detection circuit (or envelope curve detection circuit), a CDR (Clock Data Recovery) circuit 22, a deserializer circuit 23, and a 10B8B circuit 24. The CDR circuit 22 carries out processing of separating received data and a clock superimposed on the data. The deserializer circuit 23 carries out processing of converting serial data into parallel data. The 10B8B circuit 24 carries out processing of converting 10-bit data into 8-bit data.

[Structural Example 2]

Figure 4B:
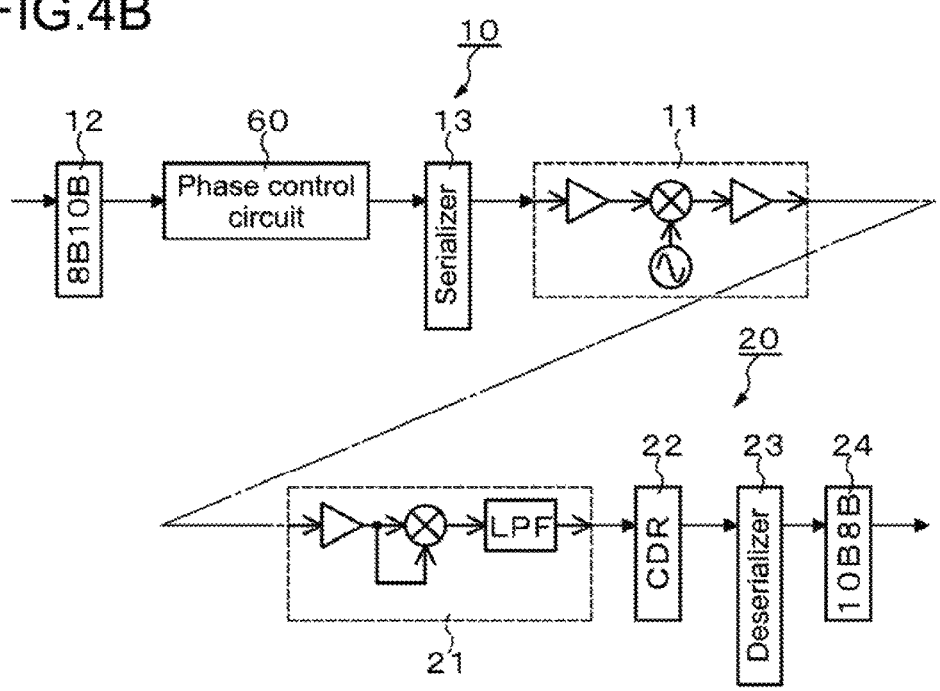
FIG. 4B is a block diagram showing a structural example 2 of the transmission system according to the embodiment.

FIG. 4B is a block diagram showing a structural example 2 of the transmission system of this embodiment. In the structural example 1, the phase control circuit 60 is interposed between the serializer circuit 13 and the signal generation section 11. In the structural example 1, the phase control circuit 60 is interposed between the 8B10B circuit 12 and the serializer circuit 13. Other structures of the transmission circuit 10 and the reception circuit 20 are the same as those of the structural example 1.

As described above, in providing the phase control circuit 60 that changes the phase of carrier waves based on transmission data in the transmission circuit 10 that uses the ASK modulation circuit, the signal restoring section 21 constituted of the square detection circuit (or envelope curve detection circuit) can be used as it is without any circuital change. Therefore, the CDR circuit 22 and the like subsequent to the signal restoring section 21 can also be used as they are without any circuital change.

In the phase control circuit 60, as a structure for changing the phase of carrier waves, there are a structure for changing the phase of carrier waves for each bit of transmission data and a structure for changing the phase of carrier waves for each gathering of Logics 1 or Logics 0 of transmission data. The "gathering" used herein refers to a group of bits for which the same logic continues. When the same logic does not continue, 1 bit of Logic 1 or Logic 0 becomes the "gathering".

Hereinafter, those structures will be described with respect to the case of the ASK modulation with the modulation degree=1 (OOK modulation) and the case of the ASK modulation with the modulation degree<1.

[ASK Modulation with Modulation Degree=1]

Figure 5A:
FIG. 5A is a diagram showing a modulation signal in a case where the phase of the carrier waves is not changed in the ASK modulation with the modulation degree=1.

FIG. 5A is a diagram showing a modulation signal in a case where the phase of carrier waves is not changed. This corresponds to FIG. 2A, and the modulation signal becomes 0 when the transmission data is 0 and becomes $\cos(2\pi f_c t)$ when the transmission data is 1.

Figure 5B:
FIG. 5B is a diagram showing Method 1 for randomly switching the phase with respect to a bit of transmission data.
Figure 5C:
FIG. 5C is a diagram showing Method 2 for alternately switching the phase with respect to Logic 1 of the transmission data.

As the structure for changing the phase of carrier waves for each bit of transmission data, there are a method of randomly switching the phase with respect to the bit of transmission data shown in FIG. 5B (Method 1), a method of alternately switching the phase with respect to Logic 1 (or Logic 0) of transmission data shown in FIG. 5C (Method 2), and the like.

Figure 6A:
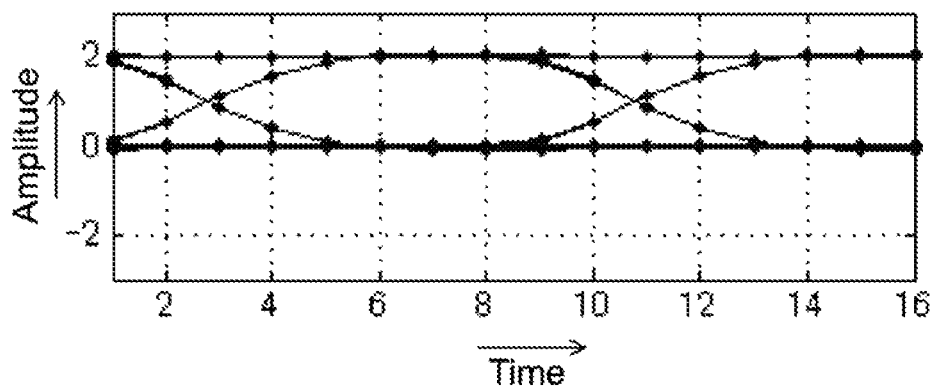
FIG. 6A is a diagram showing an eye pattern of an envelope curve of the modulation signal in a case where the phase of carrier waves is not changed in the ASK modulation with the modulation degree=1.
Figure 6B:
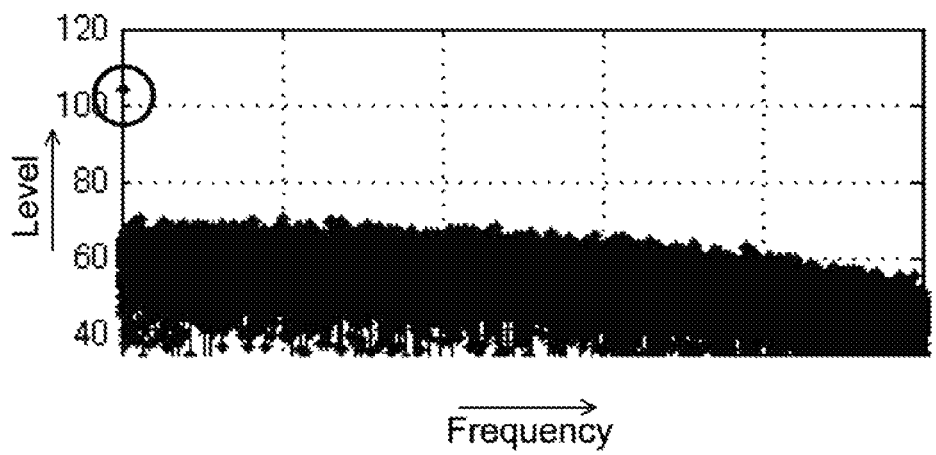
FIG. 6B is a diagram showing frequency components of the modulation signal.
Figure 6C:
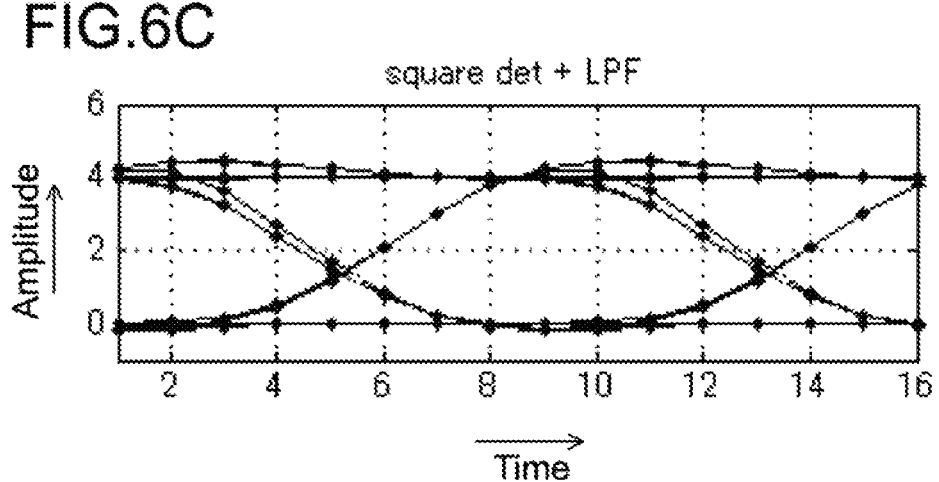
FIG. 6C is a diagram showing an eye pattern of a detection output.
Figure 7A:
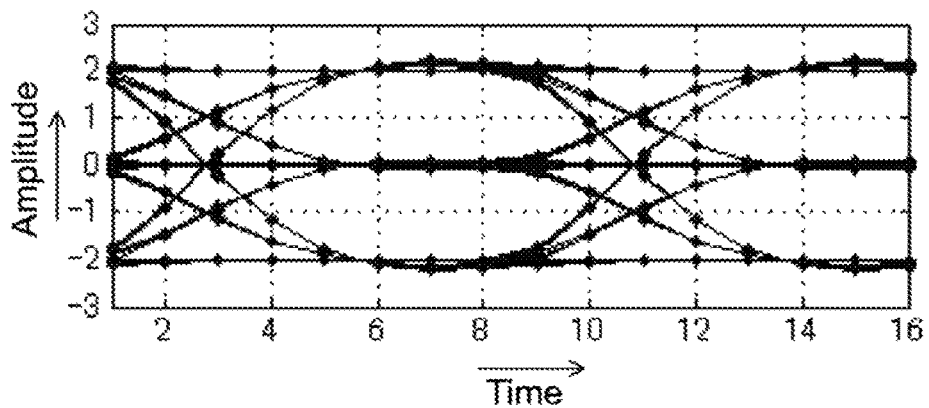
FIG. 7A is a diagram showing an eye pattern of an envelope curve of the modulation signal in the case of Method 1 for randomly switching the phase with respect to the bit of transmission data in the ASK modulation with the modulation degree=1.
Figure 7B:
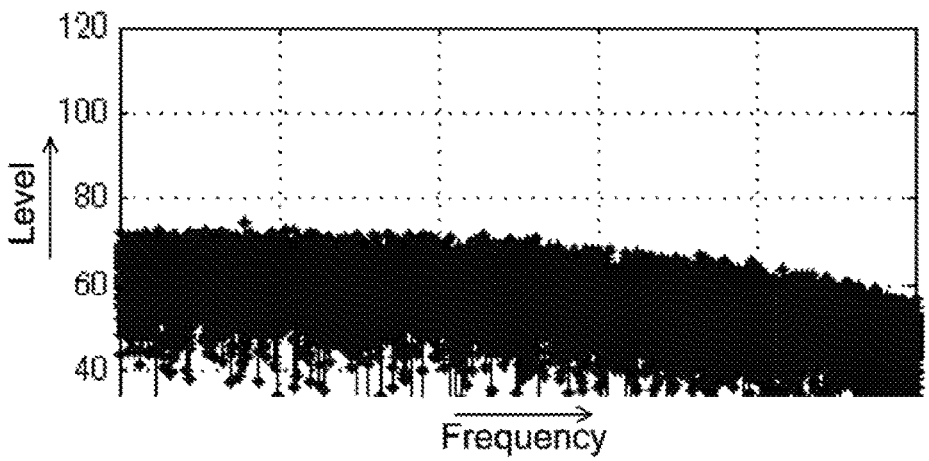
FIG. 7B is a diagram showing frequency components of the modulation signal.
Figure 7C:
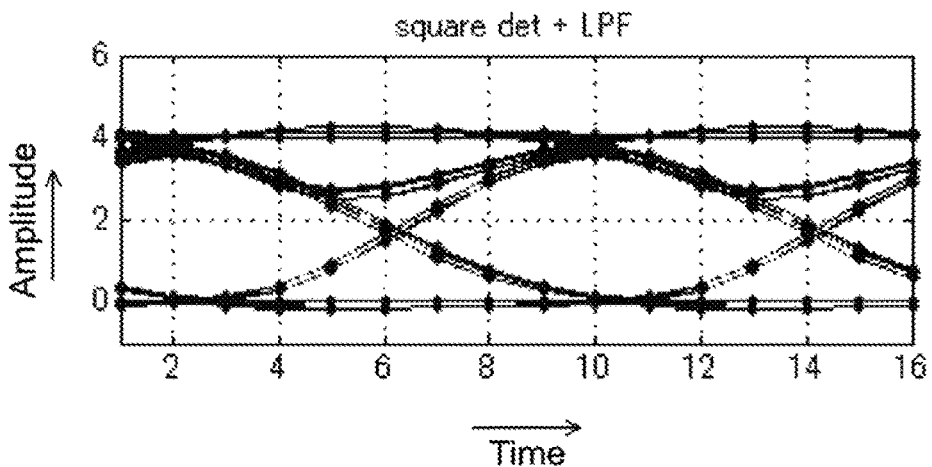
FIG. 7C is a diagram showing an eye pattern of the detection output.
Figure 8A:
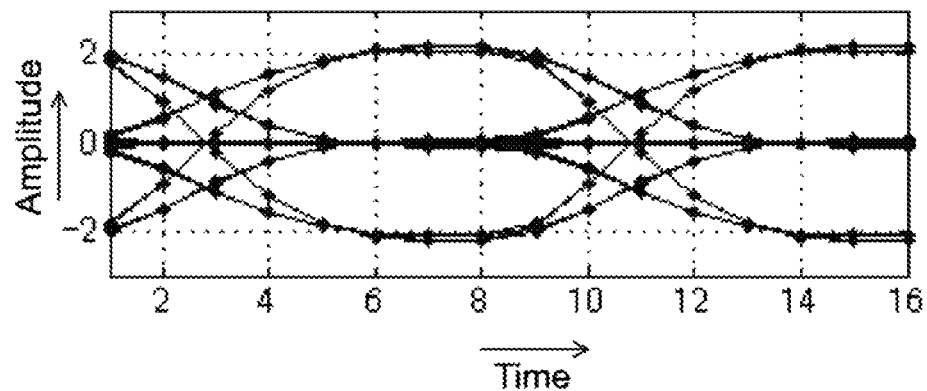
FIG. 8A is a diagram showing an eye pattern of an envelope curve of the modulation signal in the case of Method 2 for alternately switching the phase with respect to Logic 1 of the transmission data in the ASK modulation with the modulation degree=1.
Figure 8B:
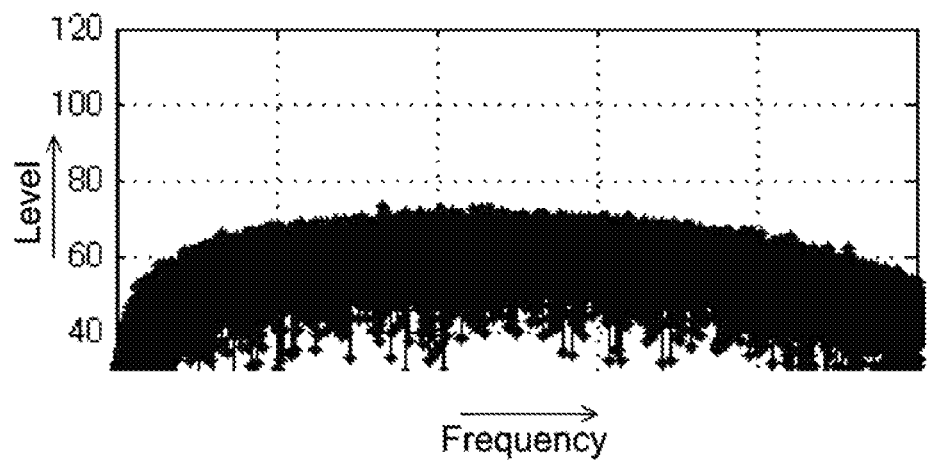
FIG. 8B is a diagram showing frequency components of the modulation signal.
Figure 8C:
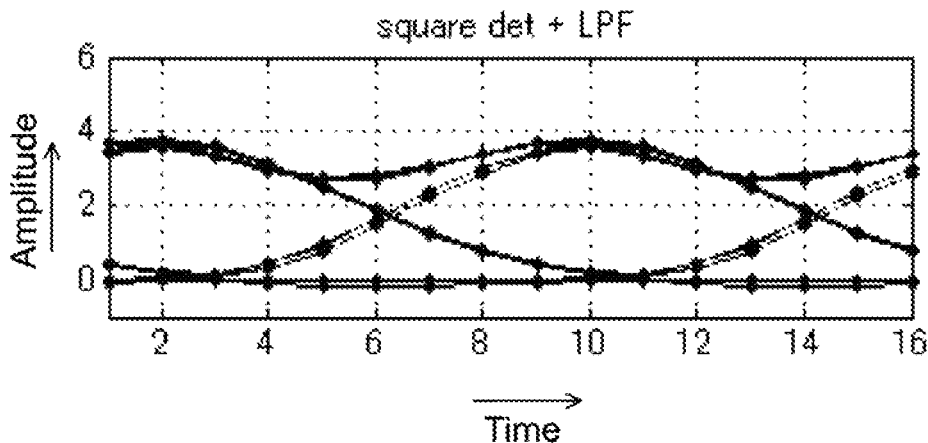
FIG. 8C is a diagram showing an eye pattern of the detection output.

An eye pattern of an envelope curve of the modulation signal, frequency components of the modulation signal, and an eye pattern of a detection output in a case where the phase of carrier waves is not changed are shown in FIGS. 6A, 6B, and 6C, respectively. The eye pattern of the envelope curve of the modulation signal, the frequency components of the modulation signal, and the eye pattern of the detection output in the case of Method 1 where the phase is randomly switched with respect to the bit of transmission data are shown in FIGS. 7A, 7B, and 7C, respectively. The eye pattern of the envelope curve of the modulation signal, the frequency components of the modulation signal, and the eye pattern of the detection output in the case of Method 2 where the phase is alternately switched with respect to Logic 1 of transmission data are shown in FIGS. 8A, 8B, and 8C, respectively.

Figure 5D:
FIG. 5D is a diagram showing Method 3 for randomly switching the phase with respect to a gathering of Logics 1 of the transmission data.
Figure 5E:
FIG. 5E is a diagram showing Method 4 for alternately switching the phase with respect to the gathering of Logics 1 of the transmission data.
Figure 5F:
FIG. 5F is a diagram showing Method 5 for switching the phase such that an emergence count of +(0 degree) becomes equal to that of −(180 degrees) with respect to the gathering of Logics 1 of the transmission data.

As the structure for changing the phase of carrier waves for each gathering of Logics 1 or Logics 0 of transmission data, there is a method of randomly switching the phase with respect to the gathering of Logics 1 (or Logics 0) of the transmission data shown in FIG. 5D (Method 3). Further, there are a method of alternately switching the phase with respect to the gathering of Logics 1 (or Logics 0) of the transmission data shown in FIG. 5E (Method 4), and a method of switching the phase such that an emergence count of +(0 degree) becomes equal to that of −(180 degrees) with respect to the gathering of Logics 1 (or Logics 0) of the transmission data shown in FIG. 5F (Method 5). Here, the expression "such that an emergence count of +(0 degree) becomes equal to that of −(180 degrees)" means that "accumulations of +(0 degree) and −(180 degrees) become 0".

Figure 9A:
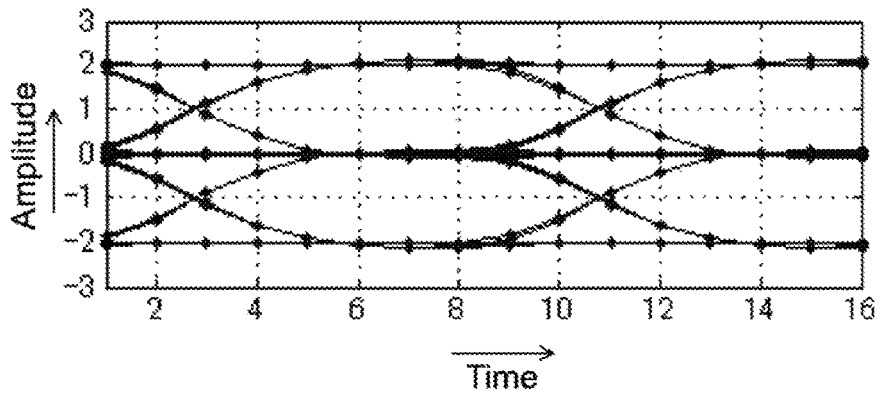
FIG. 9A is a diagram showing an eye pattern of an envelope curve of the modulation signal in the case of Method 3 for randomly switching the phase with respect to the gathering of Logics 1 of the transmission data in the ASK modulation with the modulation degree=1.
Figure 9B:
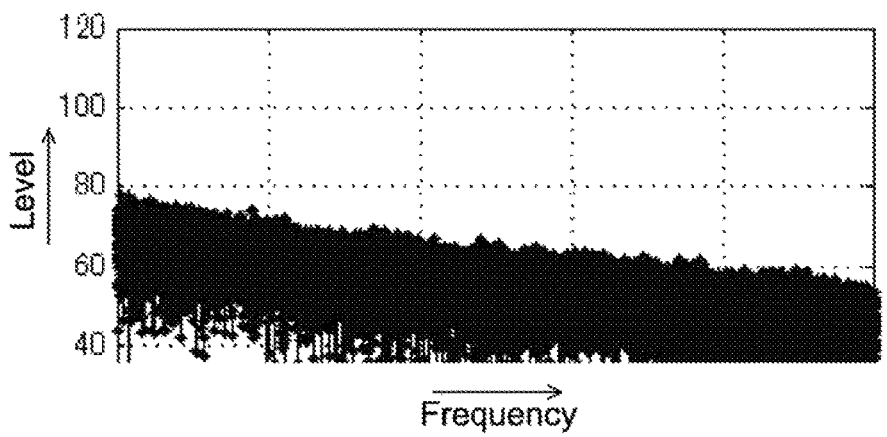
FIG. 9B is a diagram showing frequency components of the modulation signal.
Figure 9C:
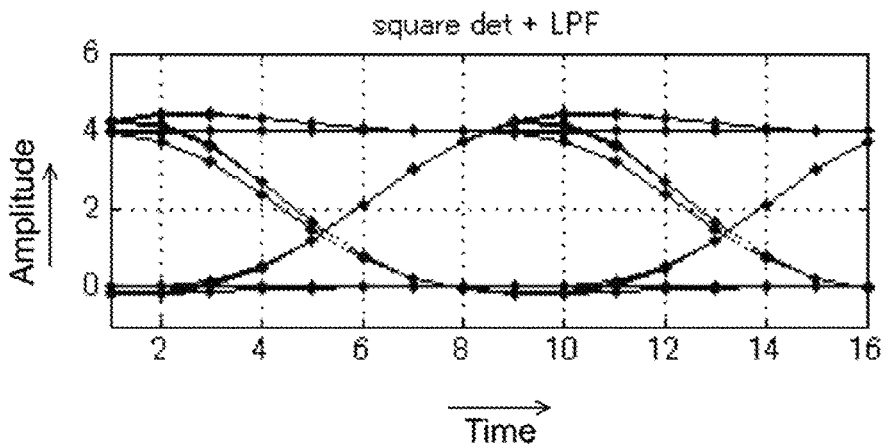
FIG. 9C is a diagram showing an eye pattern of the detection output.
Figure 10A:
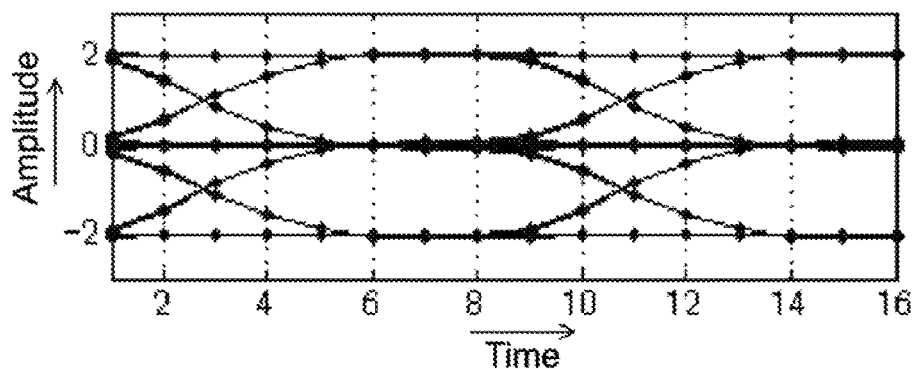
FIG. 10A is a diagram showing an eye pattern of an envelope curve of the modulation signal in the case of the technique for alternately switching the phase with respect to the gathering of Logics 1 of the transmission data in the ASK modulation with the modulation degree=1.
Figure 10B:
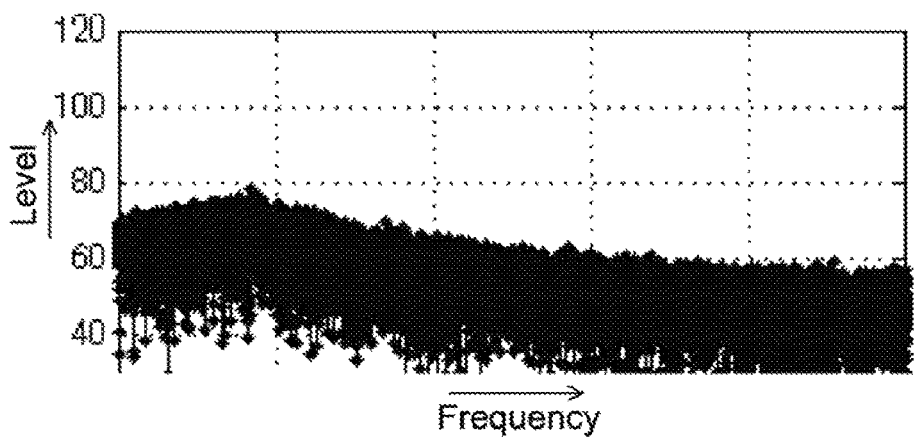
FIG. 10B is a diagram showing frequency components of the modulation signal.
Figure 10C:
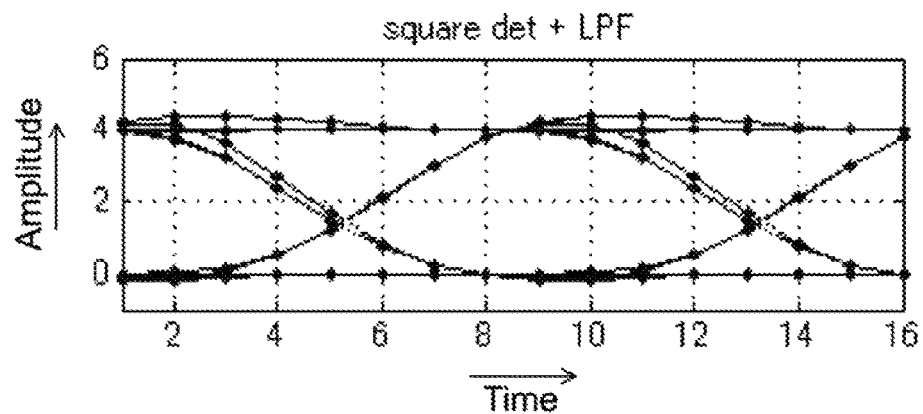
FIG. 10C is a diagram showing an eye pattern of the detection output.
Figure 11A:
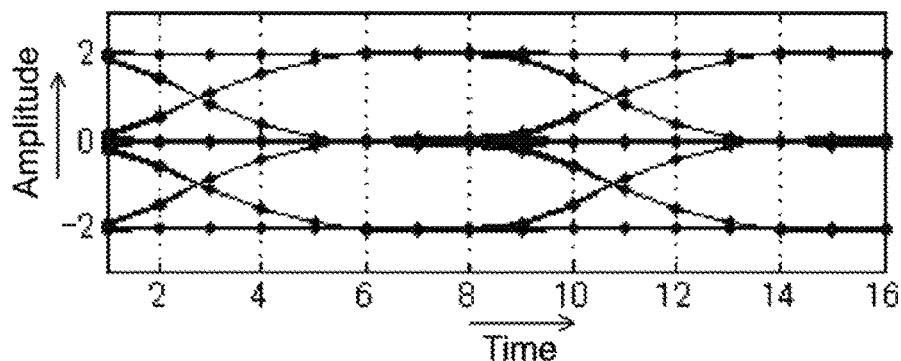
FIG. 11A is a diagram showing an eye pattern of an envelope curve of the modulation signal in the case of Method 5 for switching the phase such that an emergence count of +(0 degree) becomes equal to that of −(180 degrees) with respect to the gathering of Logics 1 of the transmission data in the ASK modulation with the modulation degree=1.
Figure 11B:
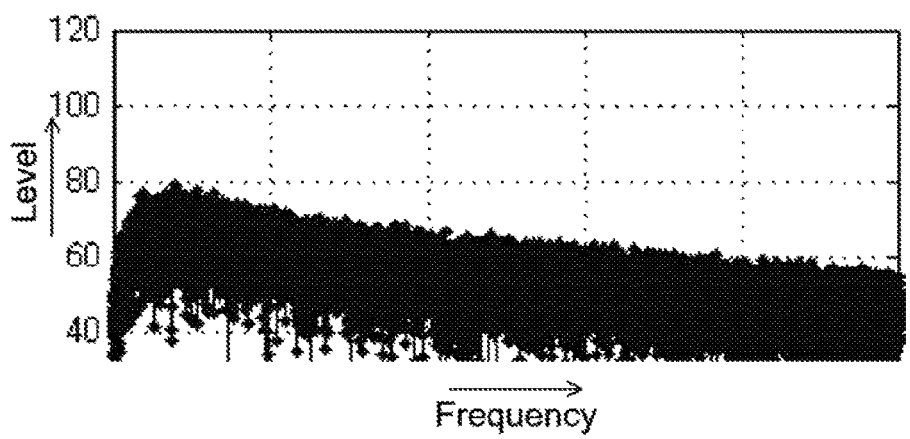
FIG. 11B is a diagram showing frequency components of the modulation signal.
Figure 11C:
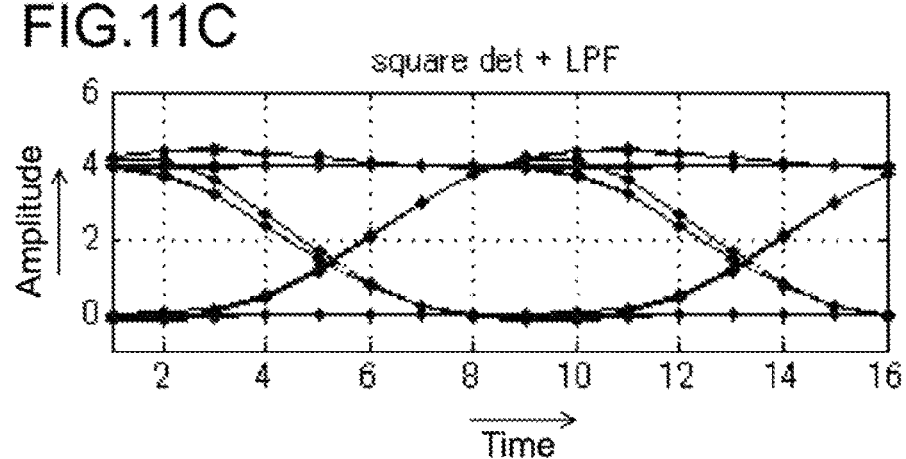
FIG. 11C is a diagram showing an eye pattern of the detection output.

The envelope curve of the modulation signal, the frequency components of the modulation signal, and the detection output in the case of Method 3 where the phase is randomly switched with respect to the gathering of Logics 1 of the transmission data are shown in FIGS. 9A, 9B, and 9C, respectively. The envelope curve of the modulation signal, the frequency components of the modulation signal, and the detection output in the case of Method 4 where the phase is alternately switched with respect to the gathering of Logics 1 of the transmission data are shown in FIGS. 10A, 10B, and 10C, respectively. The envelope curve of the modulation signal, the frequency components of the modulation signal, and the detection output in the case of Method 5 where the phase is switched such that the emergence count of +(0 degree) becomes equal to that of −(180 degrees) with respect to Logic 1 of the transmission data are shown in FIGS. 11A, 11B, and 11C, respectively.

While there is a peak as indicated by a circle in FIG. 6B in the case where the phase of carrier waves is not changed, the peak can be lowered in all the cases of methods 1 to 5 described above. Specifically, in all of the cases, by changing the phase of carrier waves based on the transmission data, the peak level of the carrier wave component on the frequency axis can be lowered. Moreover, the case of changing the phase of carrier waves for each gathering of Logics 1 or Logics 0 of the transmission data (latter three Methods 3 to 5) exerts a more beautiful eye pattern, with the envelope curve being extracted, than the case of changing the phase of carrier waves for each bit of the transmission data (i.e., middle of gathering) (former two Methods 1 and 2), and is thus favorable in terms of practical use.

Further, in the case of changing the phase of carrier waves for each bit of transmission data (former two Methods 1 and 2), a precipitous change amount due to the shift between Logic 1 and Logic 0 needs to be deleted by the LPF 213 in the signal restoring section 21 of the reception circuit 20, which requires a use of a filter having precipitous characteristics as the LPF 213.

Figure 12A:
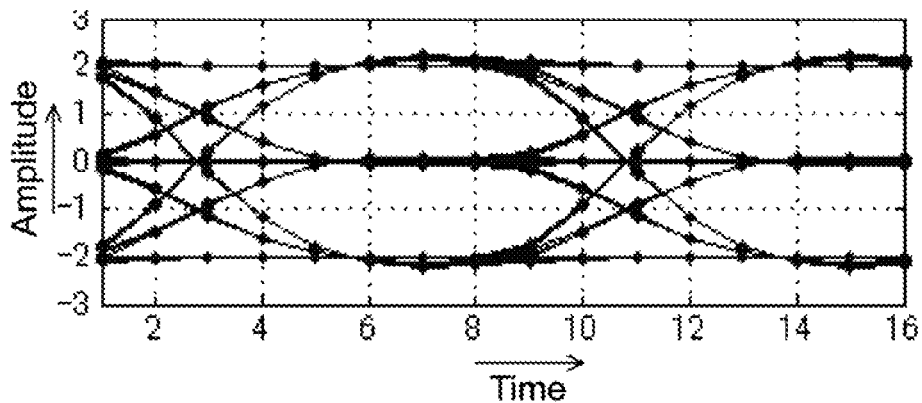
FIG. 12A is a diagram showing an eye pattern of an envelope curve of the modulation signal in the case of Method 1 for randomly switching the phase with respect to the bit of transmission data.
Figure 12B:
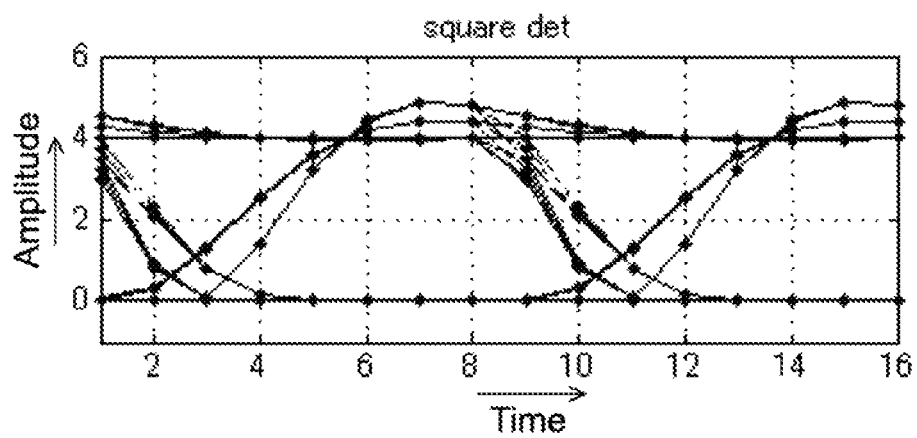
FIG. 12B is a diagram showing an eye pattern of a square detection output.
Figure 12C:
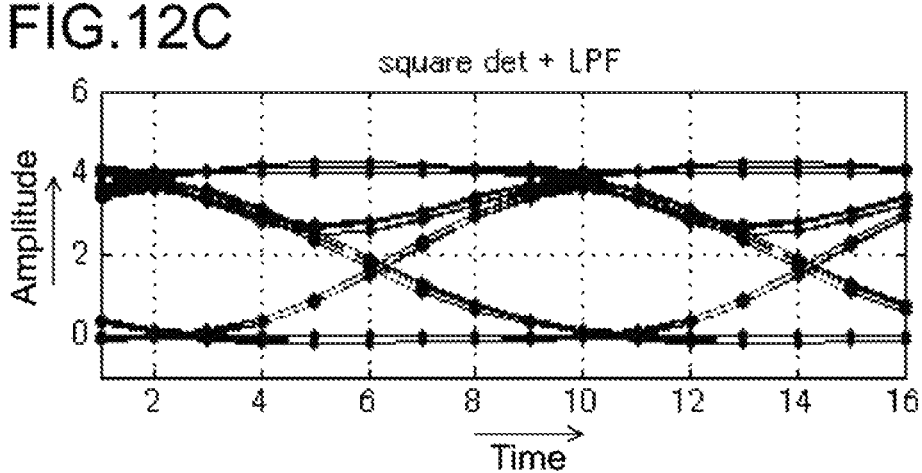
FIG. 12C is a diagram showing an eye pattern of an LPF output.
Figure 13A:
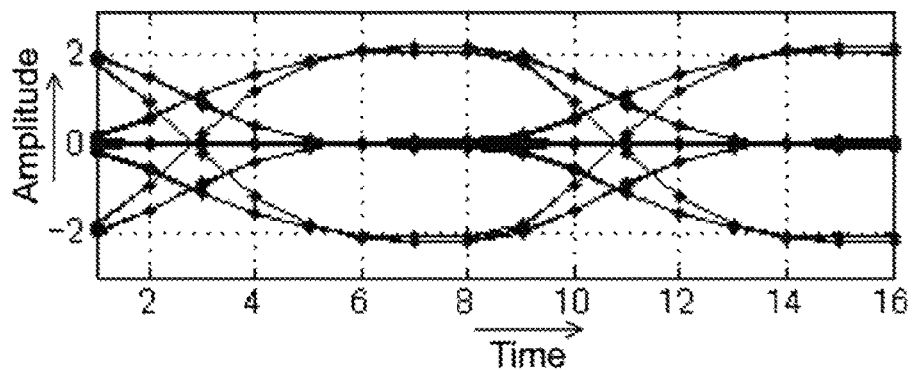
FIG. 13A is a diagram showing an eye pattern of an envelope curve of the modulation signal in the case of Method 2 for alternately switching the phase with respect to Logic 1 of the transmission data.
Figure 13B:
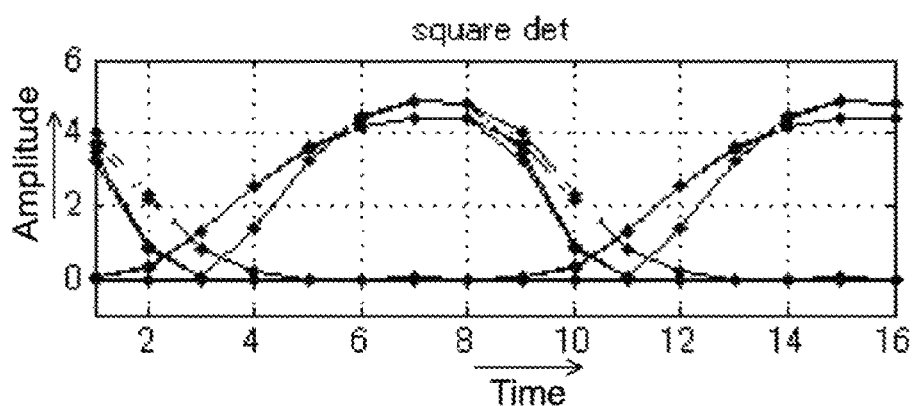
FIG. 13B is a diagram showing an eye pattern of the square detection output.
Figure 13C:
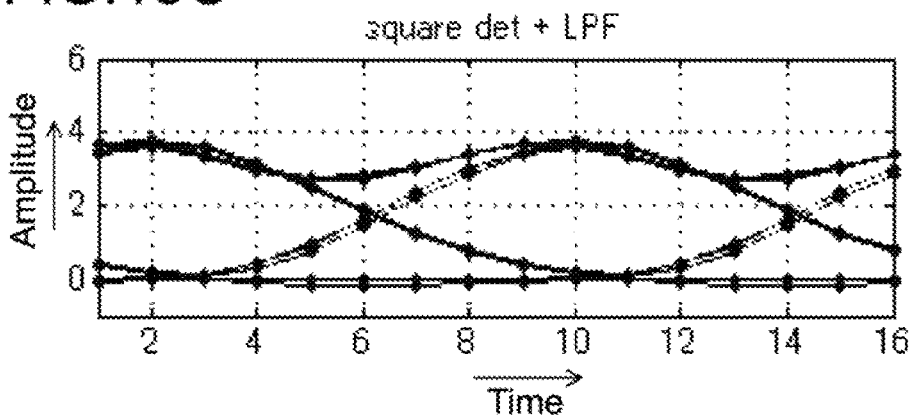
FIG. 13C is a diagram showing an eye pattern of the LPF output.
Figure 14A:
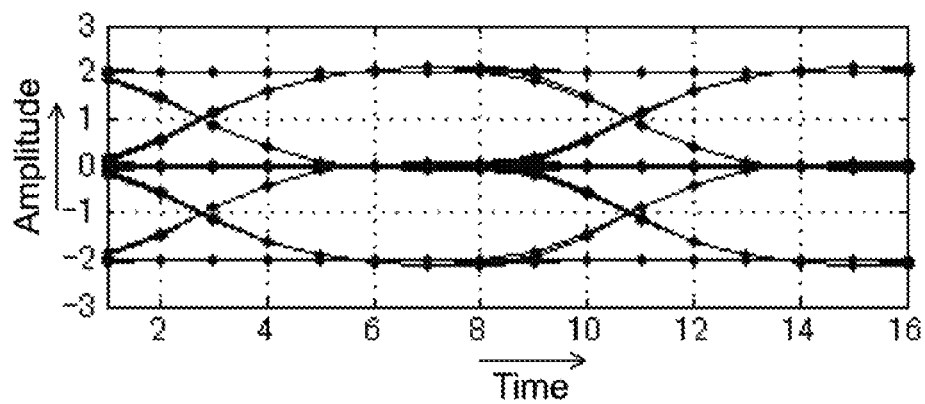
FIG. 14A is a diagram showing an eye pattern of an envelope curve of the modulation signal in the case of Method 3 for randomly switching the phase with respect to the gathering of Logics 1 of the transmission data.
Figure 14B:
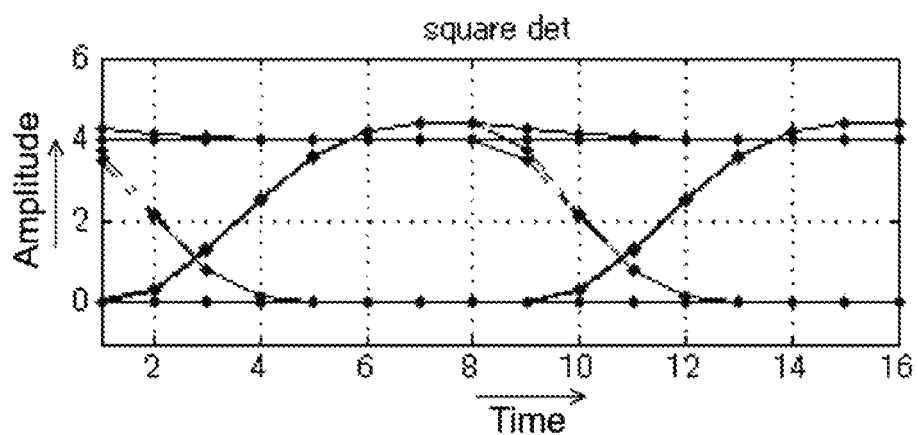
FIG. 14B is a diagram showing an eye pattern of the square detection output.
Figure 14C:
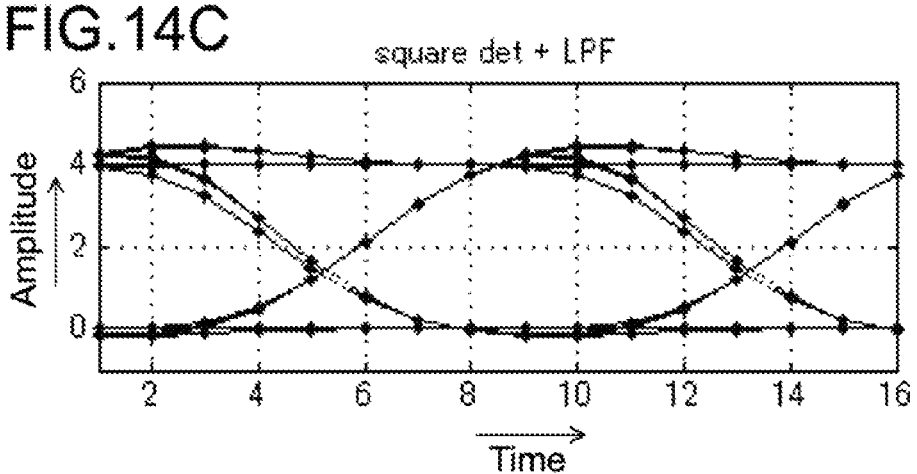
FIG. 14C is a diagram showing an eye pattern of the LPF output.

The eye pattern of the envelope curve of the modulation signal, the eye pattern of the square detection output (only low-pass component), and the eye pattern of the LPF output in the case of Method 1 where the phase is randomly switched with respect to the bit of transmission data are shown in FIGS. 12A, 12B, and 12C, respectively. The eye pattern of the envelope curve of the modulation signal, the eye pattern of the square detection output (only low-pass component), and the eye pattern of the LPF output in the case of Method 2 where the phase is alternately switched with respect to Logic 1 of the transmission data are shown in FIGS. 13A, 13B, and 13C, respectively. As a reference, the eye pattern of the envelope curve of the modulation signal, the eye pattern of the square detection output (only low-pass component), and the eye pattern of the LPF output in the case of Method 3 where the phase is randomly switched with respect to the gathering of Logics 1 of the transmission data are shown in FIGS. 14A, 14B, and 14C, respectively.

[ASK Modulation with Modulation Degree<1]

Figure 15A:
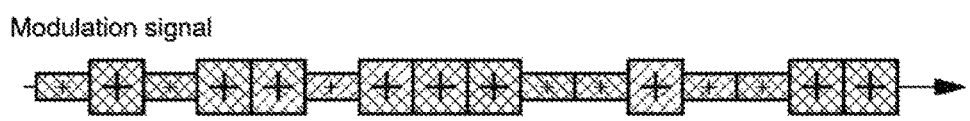
FIG. 15A is a diagram showing a modulation signal in the case where the phase of carrier waves is not changed in the ASK modulation with the modulation degree<1.

FIG. 15A is a diagram showing the modulation signal in the case where the phase of carrier waves is not changed. This corresponds to FIG. 2C, and the modulation signal becomes A cos(2 π $f_c$t) when the transmission data is 0 and becomes cos(2 π $f_c$t) when the transmission data is 1. It should be noted that the coefficient A satisfies 0<A<1.

Figure 15B:
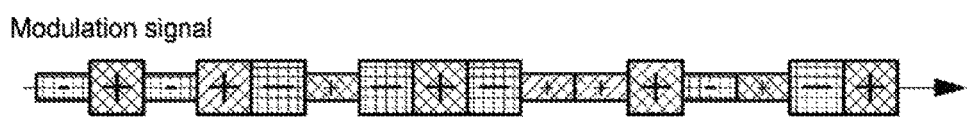
FIG. 15B is a diagram showing Method 6 for randomly switching the phase with respect to the bit of transmission data.
Figure 15C:
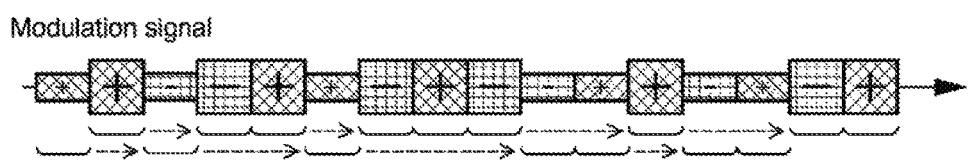
FIG. 15C is a diagram showing Method 7 for alternately switching the phase with respect to Logic 1/Logic 0 of the transmission data.

As the case of changing the phase of carrier waves for each bit of transmission data, there are two methods as in the case of the ASK modulation with the modulation degree=1. One is a method of randomly switching the phase with respect to the bit of transmission data shown in FIG. 15B (Method 6), and the other is a method of alternately switching the phase with respect to Logic 1 (or Logic 0) of the transmission data shown in FIG. 15C (Method 7).

Figure 15D:
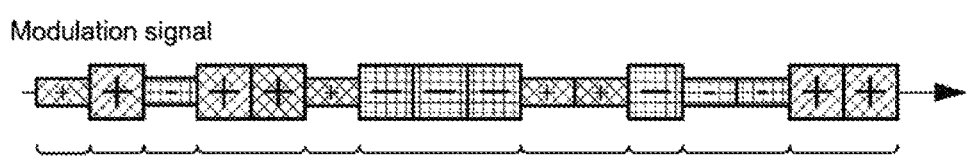
FIG. 15D is a diagram showing Method 8 for randomly switching the phase with respect to Logic 1 or Logic 0 of the transmission data.
Figure 15D:
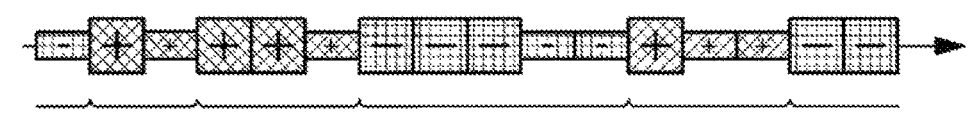
Figure 15D:
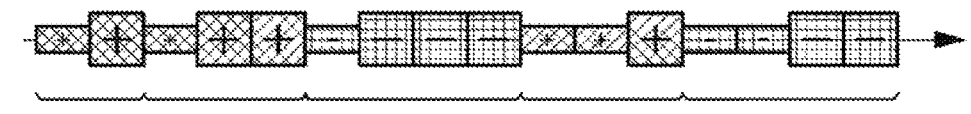

As the case of changing the phase of carrier waves for each gathering of Logics 1 or Logics 0 of the transmission data, there are three methods as in the case of the ASK modulation with the modulation degree=1. One is a method of randomly switching the phase with respect to the gathering of Logics 1 (or Logics 0) of the transmission data shown in FIG. 15D (Method 8). In this case, the method of randomly switching the phase with respect to the individual gathering of Logics 1/Logics 0, the gathering of Logics, or the gathering of Logics may be used.

Figure 16A:
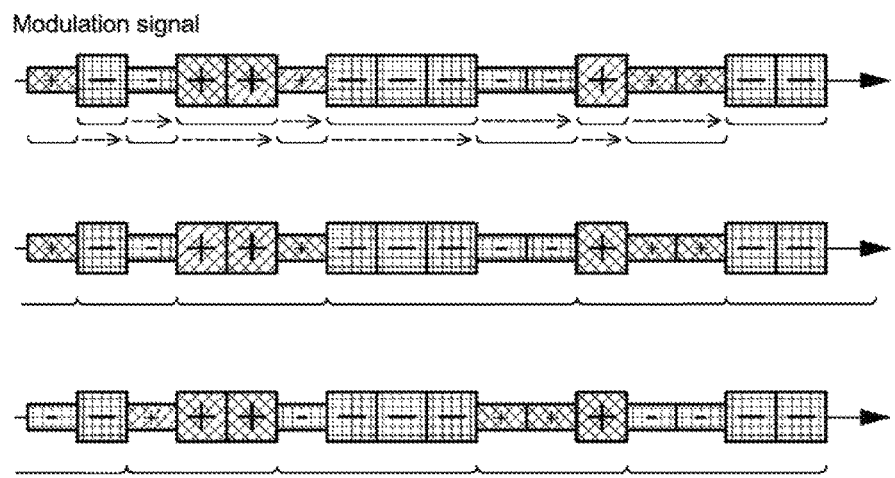
FIG. 16A is a diagram showing Method 9 for alternately switching the phase with respect to the gathering of Logics 1 or Logics 0 of the transmission data in the ASK modulation with the modulation degree<1.
Figure 16B:
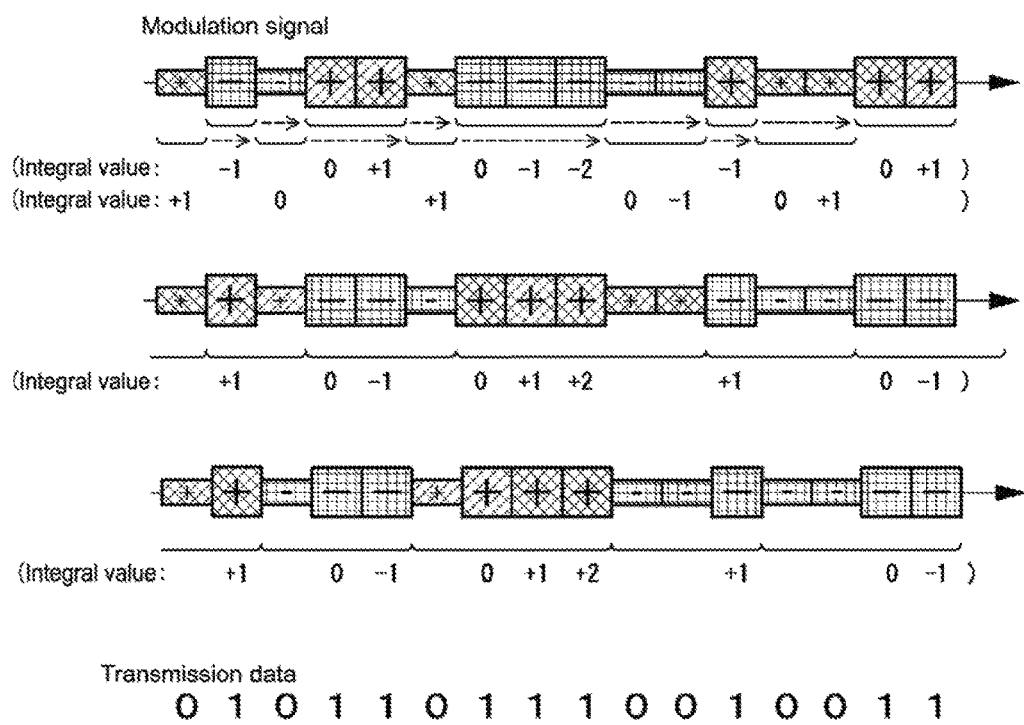
FIG. 16B is a diagram showing Method 10 for switching the phase such that the emergence count of +(0 degree) becomes equal to that of −(180 degrees) with respect to the gathering of Logics 1 or Logics 0 of the transmission data.

Another one of the methods is a method of alternately switching the phase with respect to the gathering of Logics 1 (or Logics 0) of the transmission data shown in FIG. 16A (Method 9). In this case, the method of alternately switching the phase separately for the gathering of Logics 1 and the gathering of Logics 0, with respect to the gathering of Logics, or the gathering of Logics may be used. The last one of the methods is a method of switching the phase such that an emergence count of +(0 degree) becomes equal to that of −(180 degrees) with respect to the gathering of Logics 1 (or Logics 0) of the transmission data shown in FIG. 16B (Method 10). In this case, the method of alternately switching the phase separately for the gathering of Logics 1 and the gathering of Logics 0, with respect to the gathering of Logics, or the gathering of Logics may be used.

[Phase Control Circuit]

Here, an example of the structure of the phase control circuit 60 that changes the phase of carrier waves based on transmission data, that is, an encoding circuit that carries out encoding processing on transmission data for suppressing carrier wave components, for example, will be described. Here, as an example, a circuit structure corresponding to the method of switching the phase such that an emergence count of +(0 degree) becomes equal to that of −(180 degrees) with respect to the gathering of Logics 1 of the transmission data shown in FIG. 5F (Method 5) will be described.

Figure 17:
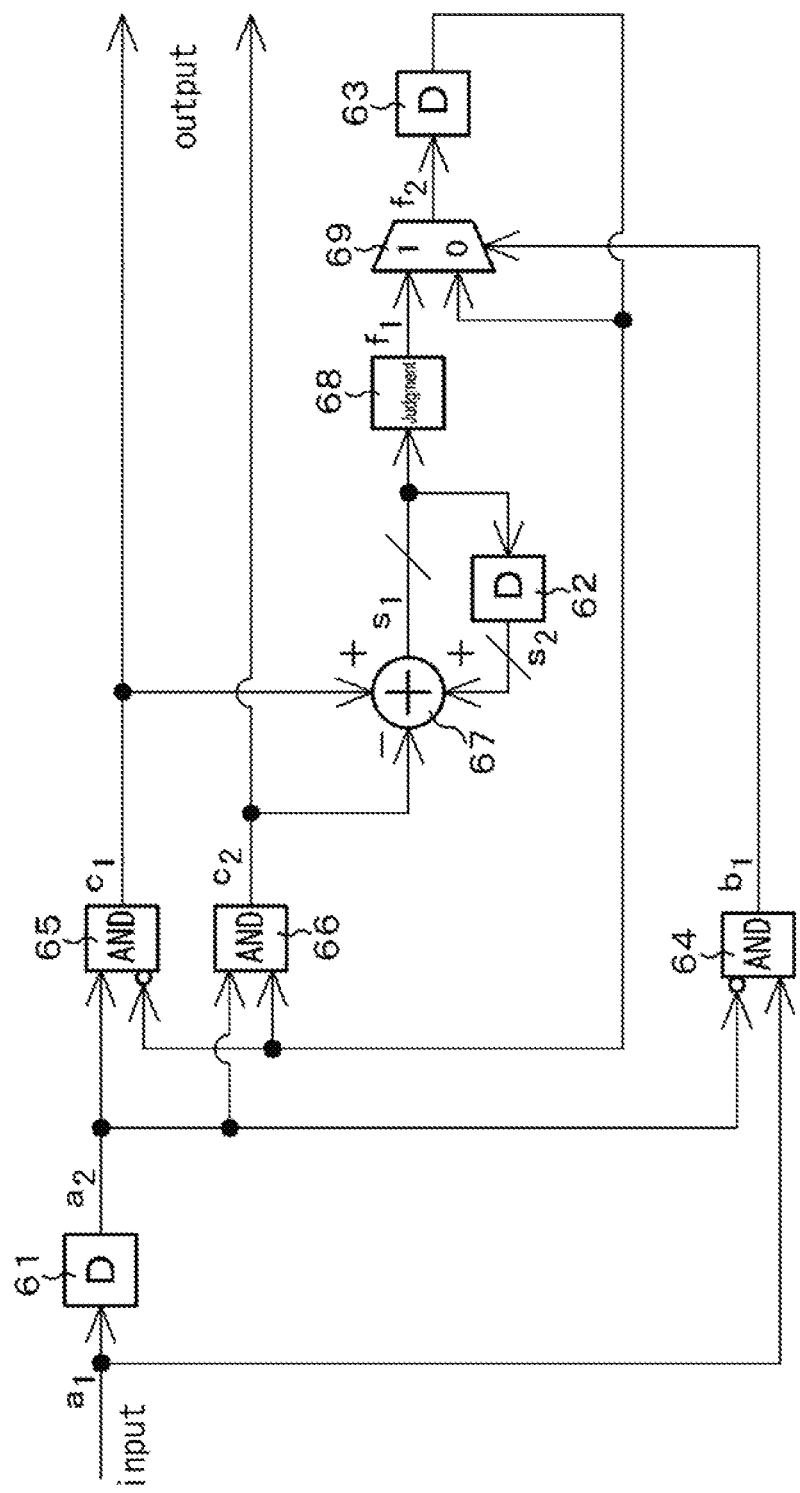
FIG. 17 is a block diagram showing a structural example of an encoding circuit used as a phase control circuit.

FIG. 17 is a block diagram showing a structural example of the encoding circuit used as the phase control circuit 60. In this example, the circuit structure corresponding to the case where an input stage of the signal generation section 11 of the transmission circuit 10 is a differential input will be described.

As shown in FIG. 17, the encoding circuit of this example includes three latch circuits 61 to 63 each constituted of a D-FF (flip-flop), an adder 67, a judgment circuit 68, and a selector 69.

Transmission data $a_1$ supplied from the serializer circuit 13 shown in FIG. 4A is input to the latch circuit 61 and becomes a positive logic input of an AND circuit 64. An output $a_2$ of the latch circuit 61 becomes a negative logic input of the AND circuit 64 and also becomes a positive logic input of an AND circuit 65 and one of positive logic inputs of an AND circuit 66. An output $b_1$ of the AND circuit 64 becomes a selection signal of the selector 69. Outputs $c_1$ and $c_2$ of the AND circuits 65 and 66 become a differential output of the encoding circuit to be supplied to the signal generation section 11 as the differential input.

Further, the output $c_1$ of the AND circuit 65 becomes one of addition inputs of the adder 67, and the output $c_2$ of the AND circuit 66 becomes a subtraction input of the adder 67. An output $s_1$ of the adder 67 becomes inputs of the judgment circuit 68 and the latch circuit 62. An output $s_2$ of the latch circuit 62 becomes the other one of the addition inputs of the adder 67. An output $f_1$ of the judgment circuit 68 becomes one of inputs of the selector 69. An output $f_2$ of the selector 69 becomes an input of the latch circuit 63. An output of the latch circuit 63 becomes the other one of the inputs of the selector 69 and also becomes a negative logic input of the AND circuit 65 and the other one of the positive logic inputs of the AND circuit 66. The judgment circuit 68 outputs 1 when $s_1$>0 is satisfied and outputs 0 otherwise.

According to the encoding circuit having the circuit structure described above, that is, the phase control circuit 60, the operation of switching the phase such that an emergence count of +(0 degree) becomes equal to that of −(180 degrees) with respect to the gathering of Logics 1 of transmission data can be realized. Accordingly, the encoding processing for suppressing carrier wave components can be carried out on the transmission data. FIG. 18 shows input/output logical values of the circuit sections in the encoding circuit shown in FIG. 17.

It should be noted that the circuit structure of the phase control circuit 60 exemplified herein is merely an example, and the phase control circuit 60 is not limited to such a circuit structure. Furthermore, although the circuit structure corresponding to Method 5 for switching the phase such that the emergence count of +(0 degree) becomes equal to that of −(180 degrees) with respect to the gathering of Logics 1 of the transmission data is exemplified herein, a circuit can be structured based on the same idea also for other methods.

It should be noted that the present disclosure may also take the following structures.

[1] A transmission circuit, including:
  an amplitude shift modulation circuit that changes an amplitude of carrier waves based on transmission data; and
  a phase control circuit that changes a phase of the carrier waves based on the transmission data.

[2] The transmission circuit according to [1] above,
  in which the phase control circuit changes the phase of the carrier waves such that a peak level of a carrier wave component on a frequency axis is lowered.

[3] The transmission circuit according to [2] above,
  in which the phase control circuit changes the phase of the carrier waves for each bit of the transmission data.

[4] The transmission circuit according to [3] above,
  in which the phase control circuit randomly switches the phase with respect to the bit of the transmission data.

[5] The transmission circuit according to [3] above,
  in which the phase control circuit alternately switches the phase with respect to Logic 1 or Logic 0 of the transmission data.

[6] The transmission circuit according to [2] above,
  in which the phase control circuit changes the phase of the carrier waves for each gathering of Logics 1 or Logics 0 of the transmission data.

[7] The transmission circuit according to [6] above,
in which the phase control circuit randomly switches the phase with respect to the gathering of Logics 1 or Logics 0 of the transmission data.

[8] The transmission circuit according to [6] above,
in which the phase control circuit alternately switches the phase with respect to the gathering of Logics 1 or Logics 0 of the transmission data.

[9] The transmission circuit according to [6] above,
in which the phase control circuit switches the phase such that an emergence count of +(0 degree) becomes equal to that of −(180 degrees) with respect to the gathering of Logics 1 or Logics 0 of the transmission data.

[10] The transmission method according to any one of [1] to [9] above,
in which the carrier wave is a high-frequency signal.

[11] The transmission method according to [10] above,
in which the high-frequency signal is a millimeter waveband signal.

[12] A transmission method, including:
changing, in transmitting transmission data using an amplitude shift modulation method for changing an amplitude of carrier waves based on the transmission data, a phase of the carrier waves based on the transmission data.

[13] The transmission method according to [12] above,
in which the carrier wave is a high-frequency signal.

[14] The transmission method according to [13] above,
in which the high-frequency signal is a millimeter waveband signal.

[15] A transmission system, including:
a transmission circuit; and
a reception circuit that receives a signal transmitted from the transmission circuit,
the transmission circuit including
an amplitude shift modulation circuit that changes an amplitude of carrier waves based on transmission data, and
a phase control circuit that changes a phase of the carrier waves based on the transmission data.

[16] The transmission system according to [15] above,
in which the carrier wave is a high-frequency signal.

[17] The transmission system according to [16] above,
in which the high-frequency signal is a millimeter waveband signal.

DESCRIPTION OF REFERENCE NUMERALS 1 transmission system
10 transmission circuit
11 signal generation section
12 8B10B circuit
13 serializer circuit
20 reception circuit
21 signal restoring section
30 waveguide cable
40, 50 connector apparatus
60 phase control circuit
61-63 latch circuit
64-66 AND circuit
67 adder
68 judgment circuit
69 selector
100 first communication apparatus
111 oscillator
113, 212 multiplier
112, 114, 211 buffer
200 second communication apparatus
213 LPF (Low-Pass Filter)

The invention claimed is:
1. A transmission circuit, comprising:
circuitry configured to:
superimpose information on transmission data,
wherein the information is superimposed on a first amplitude of a carrier wave such that a phase of the carrier wave is uninvolved with the superimposed information;
change the phase of the carrier wave based on the transmission data; and
change a second amplitude of the phase changed carrier wave.

2. The transmission circuit according to claim 1, wherein the circuitry is further configured to change the phase of the carrier wave based on reduction of a peak level of a carrier wave component on a frequency axis.

3. The transmission circuit according to claim 1,
wherein the transmission data comprises a plurality of bits, and
wherein the circuitry is further configured to change the phase of the carrier wave for each bit of the plurality of bits of the transmission data.

4. The transmission circuit according to claim 3, wherein the circuitry is further configured to switch the phase of the carrier wave with respect to a bit of the plurality of bits of the transmission data in a random manner.

5. The transmission circuit according to claim 1, wherein the circuitry is further configured to switch the phase alternately with respect to one of logic 1 of the transmission data or logic 0 of the transmission data.

6. The transmission circuit according to claim 1,
wherein the transmission data comprises a plurality of bits,
wherein the plurality of bits of the transmission data comprises a first group of bits of continuous logic 1 level and a second group of bits of continuous logic 0 level, and
wherein the circuitry is further configured to change the phase of the carrier wave for one of the first group of bits of continuous logic 1 level or the second group of bits of continuous logic 0 level.

7. The transmission circuit according to claim 6, wherein the circuitry is further configured to switch the phase of the carrier wave, in a random manner, with respect to the one of the first group of bits of continuous logic 1 level or the second group of bits of continuous logic 0 level.

8. The transmission circuit according to claim 6, wherein the circuitry is further configured to switch the phase alternately with respect to the one of the first group of bits of continuous logic 1 level or the second group of bits of continuous logic 0 level.

9. The transmission circuit according to claim 6,
wherein the circuitry is further configured to switch the phase of the carrier wave such that an emergence count of +(0 degree) becomes equal to that of −(180 degrees), and
wherein the phase of the carrier wave is switched based on the one of the first group of bits of continuous logic 1 level or the second group of bits of continuous logic 0 level.

10. A transmission method, comprising:
  in a transmission circuit:
    superimposing information on transmission data,
      wherein the information is superimposed on a first amplitude of a carrier wave such that a phase of the carrier wave is uninvolved with the superimposed information;
    changing the phase of the carrier wave based on the transmission data; and
    changing a second amplitude of the phase changed carrier wave.

11. A transmission system, comprising:
  a transmission circuit configured to transmit a signal; and
  a reception circuit configured to receive the signal,
  wherein the transmission circuit includes:
    circuitry configured to:
      superimpose information on transmission data,
        wherein the information is superimposed on a first amplitude of a carrier wave such that a phase of the carrier wave is uninvolved with the superimposed information;
      change the phase of the carrier wave based on the transmission data; and
      change a second amplitude of the phase changed carrier wave.

\* \* \* \* \*